United States Patent
Chen et al.

(10) Patent No.: US 10,193,683 B2
(45) Date of Patent: Jan. 29, 2019

(54) METHODS AND DEVICES FOR SELF-INTERFERENCE CANCELATION

(71) Applicant: Intel Corporation, Santa Clara, CA (US)

(72) Inventors: Chia-Hsiang Chen, Santa Clara, CA (US); Ching-En Lee, Hillsboro, OR (US); Feng Xue, Redwood City, CA (US); Shu-Ping Yeh, New Taipei (TW)

(73) Assignee: INTEL CORPORATION, Santa Clara, CA (US)

( * ) Notice: Subject to any disclaimer, the term of this patent is extended or adjusted under 35 U.S.C. 154(b) by 18 days.

(21) Appl. No.: 15/214,531

(22) Filed: Jul. 20, 2016

(65) Prior Publication Data

US 2018/0026775 A1    Jan. 25, 2018

(51) Int. Cl.
| | | |
|---|---|---|
| *H04L 5/14* | (2006.01) | |
| *H04B 1/44* | (2006.01) | |
| *H04B 15/00* | (2006.01) | |
| *H04B 1/525* | (2015.01) | |

(52) U.S. Cl.
CPC .............. *H04L 5/1461* (2013.01); *H04B 1/44* (2013.01); *H04B 1/525* (2013.01); *H04B 15/00* (2013.01)

(58) Field of Classification Search
CPC ........ H04B 15/00; H04B 1/44; H04L 57/1461
See application file for complete search history.

(56) References Cited

U.S. PATENT DOCUMENTS

| | | | |
|---|---|---|---|
| 4,558,462 A | 12/1985 | Horiba et al. | |
| 6,172,565 B1 | 1/2001 | Chen et al. | |
| 6,380,969 B1* | 4/2002 | Limberg | H04N 5/21 348/21 |
| 6,519,304 B1* | 2/2003 | Limberg | H04N 5/08 348/471 |
| 6,952,460 B1 | 10/2005 | Van Wechel et al. | |
| 7,733,996 B2 | 6/2010 | Wu et al. | |
| 7,953,579 B2 | 5/2011 | Hollis | |
| 9,252,831 B2 | 2/2016 | Rimini et al. | |
| 2003/0031242 A1 | 2/2003 | Awad et al. | |
| 2006/0277236 A1 | 12/2006 | Pisek et al. | |
| 2007/0184782 A1 | 8/2007 | Sahota et al. | |
| 2010/0315428 A1* | 12/2010 | Curry | G06T 1/20 345/543 |
| 2011/0090973 A1 | 4/2011 | Mishra et al. | |
| 2011/0143700 A1 | 6/2011 | Lagunas Hernandez et al. | |

(Continued)

OTHER PUBLICATIONS

European Search Report based on application No. 17177267.6 dated Nov. 9, 2017 (7 pages) (Reference Purpose Only).

(Continued)

*Primary Examiner* — Khaled M Kassim
(74) *Attorney, Agent, or Firm* — Viering, Jentschura & Partners MBB

(57) ABSTRACT

A communication circuit arrangement includes a signal path circuit configured to separately apply a kernel dimension filter and a delay tap dimension filter to an input signal for an amplifier to obtain an estimated interference signal, a cancelation circuit configured to subtract the estimated interference signal from a received signal to obtain a clean signal, and a filter update circuit configured to alternate between updating the kernel dimension filter and the delay tap dimension filter using the clean signal.

15 Claims, 16 Drawing Sheets

(56) References Cited

U.S. PATENT DOCUMENTS

| | | | |
|---|---|---|---|
| 2011/0149714 A1 | 6/2011 | Rimini et al. | |
| 2012/0140860 A1* | 6/2012 | Rimini | H04B 1/525 375/350 |
| 2013/0044791 A1* | 2/2013 | Rimini | H04B 1/109 375/219 |
| 2013/0110897 A1* | 5/2013 | Nam | H03H 17/0294 708/300 |
| 2013/0301487 A1 | 11/2013 | Khandani | |
| 2014/0037225 A1* | 2/2014 | Hogasten | G06T 5/50 382/260 |
| 2014/0122067 A1* | 5/2014 | Kroeker | G10L 25/15 704/209 |
| 2014/0169431 A1* | 6/2014 | Arambepola | H04L 27/0006 375/227 |
| 2014/0240512 A1* | 8/2014 | Hogasten | H04N 5/2257 348/164 |
| 2015/0318976 A1 | 11/2015 | Eltawil et al. | |
| 2016/0071009 A1* | 3/2016 | Abrishamkar | G06N 3/08 706/25 |
| 2016/0072592 A1* | 3/2016 | Tu | H04L 25/0254 375/219 |
| 2016/0072649 A1* | 3/2016 | Tu | G06N 3/04 375/346 |

OTHER PUBLICATIONS

Notice of Allowance based on U.S. Appl. No. 14/861,421 (8 pages) dated Dec. 6, 2017.

Extended European Search Report, EP Application No. 16184520.1, dated Jan. 23, 2017, 10 pages.

Liu et al.: "FPGA implementation of RLS adaptive filter using dichotomous coordinate descent iterations", IEEE International Conference, Jun. 14, 2009, 5 pages.

Arablouei et al.: Recursive Total Least-Squares Algorithm based on Inverse Power Method and Dichotomous coordinate-descent Iterations, IEEE Transactions on Signal Processing, Apr. 15, 2015, pp. 1941-1949, vol. 63, No. 8.

Liu: "DCD Algorithm: Architectures, FPGA Implementations and Applications", Communications Research Group, Department of Electronics, University of York, Nov. 2008, 159 pages.

"Adaptive filter", Wikipedia, printed Sep. 22, 2015, 8 pages.

Douglas: "Introduction to Adaptive Filters", CRC Press LLC, 1999, 20 pages.

"Adaptive Interference Canceling", printed Sep. 22, 2015, 3 pages.

"Overview of Adaptive Filters and Applications", MATLAB & Simulink, printed Sep. 22, 2015, 4 pages.

Non-final Office Action received for U.S. Appl. No. 14/861,421, dated Jun. 2, 2017, 36 pages.

International Search Report based on Application No. PCT/US2016/054286 (4 Pages) dated Jun. 19, 2017 (Reference Purpose Only).

Zakharov et al, "Low-Complexity RLS Algorithms Using Dichotomous Coordinate Descent Iterations", IEEE Transactions on Signal Processing, vol. 56, No. 7, 2008, pp. 3150-3161.

Bharadia et al, "Full Duplex MIMO Radios", 2014, 13 pages.

Bharadia et al, "Full Duplex Radios", 2013, 12 pages.

Bai et al, "Convergence of the Iterative Hammerstein System Identification Algorithm", IEEE Transactions on Automatic Control, vol. 49, No. 11, 2004, pp. 1929-1940.

* cited by examiner

METHODS AND DEVICES FOR SELF-INTERFERENCE CANCELATION

TECHNICAL FIELD

Various embodiments relate generally to methods and devices for self-interference cancelation

BACKGROUND

Interference cancelation is seen as a key enabler of full-duplex radio communications. As such full-duplex radios generally transmit and receive simultaneously on a shared antenna, interference may leak from the transmit chain to the receive chain via the duplexing circuitry connected to the antenna, thus producing self-interference in signals received by the received chain. While special duplexing circuitry may be effective in sufficiently isolating the receive chain from the transmit chain, such may be an expensive solution and thus undesirable for many manufacturers.

Digital self-interference cancelation may thus offer a lower cost alternative solution. In such self-interference cancelation solutions, one or more adaptive filters may be utilized to model the leakage path from the transmit chain to the receive chain. Accordingly, assuming an accurate model the adaptive filters may be able to produce estimated interference signals from original transmit signals. The receive chain may then subtract these estimated interference signals from received signals, thus canceling the self-interference from the received signals and producing a clean signal that may be largely free of residual self-interference.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
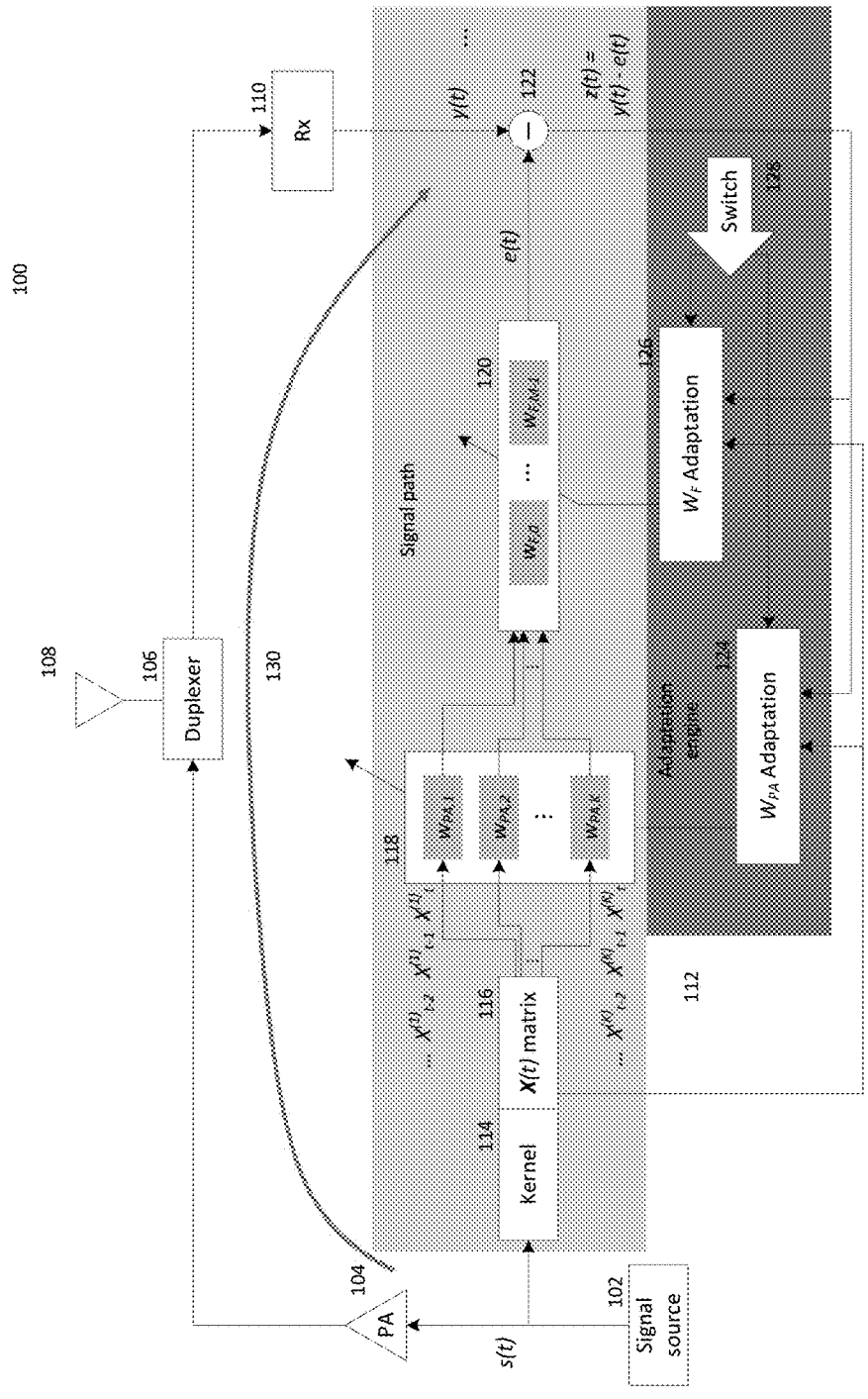
FIG. 1 shows a diagram of communication circuitry.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description and the claims expressly refer to a quantity greater than one. The terms "group (of)", "set [of]", "collection (of)", "series (of)", "sequence (of)", "grouping (of)", etc., and the like in the description and in the claims, if any, refer to a quantity equal to or greater than one, i.e. one or more. Any term expressed in plural form that does not expressly state "plurality" or "multiple" refers to a quantity equal to or greater than one. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

Both frequency-division and full duplexing communication systems commonly suffer from self-interference that is caused by a device's own transmitter. As both frequency-division and full duplexing devices transmit and receive simultaneously, such self-interference arises when the transmit signal leaks onto the receive path in the transceiver. Due to the fact that transmit power is considerably higher than receive power, the transmit signal may dominate the received signals and thus lead to a high degree of corruption at the receiver.

The transmit signal involved in self-interference will conventionally leak from the transmit path to the receive path through a duplexer, which may be placed at a common node between both the transmitter, the receiver, and a shared antenna. While duplexers may provide some isolation between the transmit and receive paths, very expensive circuitry is often required in order to provide isolation sufficient to avoid crippling self-interference.

Self-interference cancelation has thus been recognized as a potentially more cost-effective solution. In self-interference cancelation schemes, adaptive filters may be used to 'model' the transmit path leakage in order to generate estimated interference signals. These estimated interference signals may then be provided to the receive path, which may subtract the estimated interference signal from the received signal. Depending on the accuracy of the employed adaptive filters, the receiver may be able to counter the leakage signal and thus produce a clean signal that is largely free of interference. Self-interference cancelation may thus relax the requirements for expensive duplexers and allow for most cost-efficient transceiver designs.

The adaptive filters used in self-interference cancelation techniques may aim to model the radio power amplifier employed in the transmit path. However, as such radio power amplifiers are generally non-linear, the approximation techniques required to generate accurate filter weights may be relatively complex. Accordingly, many self-interference cancelation approaches may model the power amplifier as a set of 'kernels', where each kernel is tailored to model a separate nonlinear component of the response of power amplifier response. The self-interference cancelation architecture may then derive a separate adaptive filter tailored to each kernel, where the each input sample for the power amplifier may be decomposed into a kernel sample for each kernel and applied to the corresponding adaptive filter. As such designs may conventionally utilize memory-based filters, each adaptive filter may be applied to each kernel sample in addition to the previous kernel samples, or 'taps', in order to generate a filter output. The sum of the adaptive filter output for each kernel may then give the estimated interference signal (where each adaptive filter models the interference contributed by the corresponding kernel), which may be subtracted from the received signal in order to provide a 'clean' signal that is conceivably free of self-interference.

The adaptation engine responsible for dynamically updating the adaptive filter weights may play a critical role in effective self-interference cancelation. These adaptation engines may predominantly examine the 'clean' signal in order to evaluate the effectiveness of the interference cancelation, i.e. whether there is any interference residue remaining in the clean signal after the estimated interference signal has been removed. Based on the efficacy of the interference cancelation, the adaptation engines may provide updates to the adaptive filter weights in order to continuously improve the cancelation performance.

Many adaptation schemes have been developed that offer varying tradeoffs between convergence and area/power. Accordingly, while approaches such as Recursive Least Squares (RLS) designs may offer extremely fast convergence at the expense of large area and power requirements for hardware implementations. Conversely, Least Mean Squares (LMS) may offer comparatively small area and power costs while suffering from poor convergence speed. Various other adaptation schemes and accompanying hardware designs have been proposed that similarly provide different convergence to area and power tradeoffs.

Many existing adaptation solutions may jointly update filter weights for a two-dimensional filter over both kernels and taps, i.e. by considering the PA response as varying over both taps and kernels. As previously indicated, power amplifier input signals may be decomposed into kernel samples according each of a set of predetermined kernels that collectively model the power amplifier. Each of the adaptive filters may then be tailored to estimate the interference associated with a respective kernel based on the current kernel sample and a number of past kernel samples. The adaptive filters may thus function as Finite Impulse Response (FIR) filters that hold the current and multiple previous input samples, apply a respective filter weight to each input sample, and sum the weighted outputs to obtain the filter output. Accordingly, for a given memory length M, i.e. M total taps, each adaptive filter may apply a respective filter weight (out of M total filter weights) to a respective one of the M taps. Expressed mathematically, given an length-M input sample vector $X(t)=[X_t, X_{t-1}, X_{t-2}, \ldots, X_{t-M+1}]$ at a given time t, an FIR filter W with M×1 weight vector $W=[w_0, w_1, \ldots, w_{M-1}]^T$ may calculate a filter output e(t) as $$e(t) = X(t)W \quad (1)$$
$$= w_0 X_t + w_1 X_{t-1} + w_2 X_{t-2} + \ldots + w_{M-1} X_{t-M+1}$$

where $X_t$ is the current input sample and $X_{t-1}$ to $X_{t-M+1}$ are the M-1 previous input samples and each of $w_0$ to $w_{M-1}$ is a complex weight.

Accordingly, the adaptive filter may need to store the M-1 previous input samples of X(t) in addition to the current sample and, for each new input sample, apply the M weights of W to X(t) in order to obtain filter output e(t), which may represent the estimated self-interference, or 'echo'. By selecting proper weights, the FIR filter W may be able to 'filter' X(t) in order to produce filter output y(t) with certain desired characteristics, such as e.g. to approximate the kernel output in the context of self-interference cancelation.

As previously detailed, many self-interference cancelation schemes may employ kernelization to model the power amplifier as a set of kernels that each represent a non-linear component of the power amplifier (where the case described above regarding Equation (1) may thus be a non-kernelized or single kernel approach). Accordingly, such self-interference cancelation designs may employ a dedicated adaptive filter for each kernel, where each adaptive filter estimates the self-interference resulting from each respectively assigned kernel. Accordingly, the overall filter may be composed of multiple kernel filters that each model a respective kernel. In other words, for a model using K kernels and M taps, the filter W may be a K×M matrix where each row of W may contain the M weights for a respective kernel filter. Accordingly, W may be of the form $$W = \begin{bmatrix} w_t^{(1)} & w_{t-1}^{(1)} & \ldots & w_{t-M+1}^{(1)} \\ \vdots & \vdots & \ddots & \vdots \\ w_t^{(K)} & w_{t-1}^{(K)} & \ldots & w_{t-M+1}^{(K)} \end{bmatrix} \quad (2)$$

where each k-th row for k=1, 2, . . . , K contains the M filter weights for samples $X_t^{(k)} X_{t-1}^{(k)}, \ldots X_{t-M+1}^{(k)}$ of the k-th kernel.

The filter system may thus need to retain the previous M samples for each kernel (including the current sample); accordingly, X(t) may thus be defined as a K×M matrix of the past M samples for each of the K kernels, i.e.

$$X(t) = \begin{bmatrix} X_t^{(1)} & X_{t-1}^{(1)} & \ldots & X_{t-M+1}^{(1)} \\ \vdots & \vdots & \ddots & \vdots \\ X_t^{(K)} & X_{t-1}^{(K)} & \ldots & X_{t-M+1}^{(K)} \end{bmatrix} \quad (3)$$

Denoting the kernel samples for the k-th kernel as $X^{(k)}(t)=[X_t^{(k)} \ldots X_{t-M+1}^{(k)}]$ and the kernel weights for the k-th kernel as $W^{(k)}=[w_t^{(k)} \ldots w_{t-M+1}^{(k)}]$, the overall filter output e(t) may be given as $$e(t) = \sum_{i=1}^{K} X^{(i)}(t) W^{(i)} \quad (4)$$

The filter output may thus produce a single symbol e(t) at each time t that estimates the self-interference as the sum of the application of each of the K kernel filters to the previous M kernel samples of each kernel. Accordingly, such self-interference cancelation designs may model the leakage as the sum of the contributions of each kernel. The estimated interference signal e(t) may then be subtracted from the received signal y(t) (observed at the receive chain). Assuming the filter W is a suitable approximation of the actual self-interference signal, the resulting 'clean' signal z(t) (where z(t)=y(t)−e(t)) may only contain a small or even negligible amount of residual self-interference and thus may be properly received and decoded by the receiver.

Self-interference cancelation designs may generally compute filter weight updates based on analysis of the clean signal z(t) to determine both which filter weights of W are contributing to the interference residue in z(t) and how to optimally adapt these filter weights to minimize the interference residue for future input samples. As the overall filter W in such conventional solutions may be a K×M matrix of filter weights, an optimal self-interference cancelation scheme may adapt all of the KM total filter weights at each input sample. However, the required computational complexity of updating all KM filter weights may be prohibitively high and, consequently, many self-interference cancelation schemes have explored adaptation schemes that both reduce the number of weights updated at each stage and reduce the computational complexity of the update calculation.

As detailed herein, an advantageous self-interference cancelation solution of this disclosure may 'decouple' the FIR dimension from the kernel dimension in order to allow for computationally manageable adaptation stages. As will be detailed, this decoupling may allow for the FIR dimension to be updated separately from the kernel dimension and may additionally enable the usage of numerous additional computational techniques that may reduce the adaptation complexity. In particular for hardware implementations, the adaptation engine of this disclosure may provide substantial reductions in area and power and may thus prove to be an attractive design feasible with current radio technology. Additionally, the self-interference cancelation scheme may offer configurability, and accordingly may be able to support variable numbers of taps and kernels for the filter weights.

FIG. 1 shows a block diagram of communication circuitry 100, which may implement the self-interference cancelation system of this disclosure and may be a radio communication device (e.g. a mobile terminal, base station, network access point, etc.). As shown in FIG. 1, signal source 102 may generate a baseband transmit signal s(t) for power amplifier 104, which power amplifier 104 may amplify (following radio modulation, analog-to-digital conversion, and other pre-amplification stages not explicitly shown in FIG. 1) to produce an amplified RF transmit signal. Power amplifier 104 may provide the amplified RF transmit signal to duplexer 106, which may be placed between power amplifier 104 and receiver 110 in order to allow for power amplifier 104 and receiver 110 to share antenna 108 (which may be a single antenna or an antenna array). Accordingly, in a full-duplex or frequency-division duplexing scheme duplexer 106 may allow power amplifier 104 and receiver 110 to simultaneously transmit and receive, respectively, with antenna 108. Without loss of generality, communication circuitry 100 may be employed in short range, metropolitan, or cellular radio communication technologies such as 3GPP technologies (LTE, UMTS, GSM, etc.), WiFi, Bluetooth, etc. Communication circuitry 100 may be included in either uplink or downlink devices, including mobile terminals, base station, and network access points.

The shared use of antenna 108 via duplexer 106 may create self-interference, which may leak from power amplifier 104 to receiver 110 over leakage path 130 as shown in FIG. 1. Accordingly, the amplified radio transmit signal produced by power amplifier 104 via amplification of baseband transmit signal s(t) may appear in the received baseband signal y(t) produced by receiver 110. Accordingly, the presence of this leakage signal in y(t) may corrupt a desired component of y(t), i.e. the signal actually targeted by receiver 110 (such as a downlink signal received from a base station or an uplink signal received from a mobile terminal).

While incorporation of specialized duplexing circuitry in duplexer 106 may minimize the self-interference, such may be considerably expensive and thus undesirable in many designs. In order to enable sufficient reception performance by receiver 110, communication circuitry 100 may instead implement the self-interference cancelation of this disclosure with processing circuitry 112. As will be detailed, processing circuitry 112 may be configured to generate an estimated interference signal e(t) from s(t) and subtract e(t) from y(t) to produce clean signal z(t). Assuming generation of e(t) that accurately models leakage path 130, processing circuitry 112 may be able to effectively remove the self-interference signal from y(t) and thus produce clean signal z(t) that is largely free of self-interference. Processing circuitry 112 may employ an adaptive filter system in order to model leakage path 130 which, as detailed below, decouples the PA dimension of the filter from the FIR dimension, thus allowing for reduced computational demands during adaptation.

As will be detailed, in an aspect of this disclosure communication circuitry 100 may be characterized as a communication circuit arrangement including a signal path circuit (e.g. the signal path of processing circuitry 112) configured to separately apply a kernel dimension filter and a delay tap dimension filter to an input signal for an amplifier to obtain an estimated interference signal, a cancelation circuit (e.g. cancelation circuit 122) configured to subtract the estimated interference signal from a received signal to obtain a clean signal, and a filter update circuit (e.g. the adaptation engine of processing circuitry 112) configured to alternate between updating the kernel dimension filter and the delay tap dimension filter. In another aspect of this disclosure, communication circuitry 100 may be characterized as a communication circuit arrangement including a subsignal generation circuit (e.g. kernel generation circuit 114) configured to obtain one or more subsignals from an input signal for an amplifier, each of the one or more subsignals representing a non-linear component of an amplifier response and composed of a plurality of delay taps, a signal path circuit (e.g. the signal path of processing circuitry 112) configured to separately apply a first filter and a second filter to the one or more subsignals to obtain an estimated interference signal, wherein the first filter approximates the amplifier response over the one or more subsignals and the second filter approximates the amplifier response over the plurality of delay taps, a cancelation circuit (e.g. cancelation circuit 122) configured to subtract the estimated interference signal from the received signal to obtain a clean signal, and a filter update circuit (e.g. the adaptation engine of processing circuitry 112) configured to alternate between updating the first filter and updating the second filter using the clean signal.

Accordingly, as opposed to utilizing a two-dimensional filter W as expressed above in Equation (2), processing circuitry 112 may utilize a single-dimensional K×1 power amplifier filter $W_{PA}$ (PA filter circuit 118) and a single-dimensional M×1 FIR filter $W_F$ (FIR filter circuit 120). Instead of employing M different weights for each of the K PA kernels, processing circuitry 112 may thus decouple the PA dimension from the FIR dimension and utilize a single set of K×1 PA filter weights in $W_{PA}$ to collectively model the K PA kernels (over all taps) and similarly utilize a single set of M×1 FIR filter weights in $W_F$ to collectively model the M taps (over all kernels). Given this drastic reduction in the amount of filter weights (from KM to K+M), processing circuitry 112 may considerably reduce the amount of computation needed to adapt the filter weights. Accordingly, processing circuitry 112 may present an attractive self-interference cancelation system that offers strong convergence speeds while avoiding excessively complex adaptation calculations. Hardware area may consequently also be substantially reduced due to the lower computational complexity.

As shown in FIG. 1, processing circuitry 112 may include kernel generation circuit 114, matrix memory 116, PA filter circuit 118, FIR filter circuit 120, cancelation circuit 122, PA filter adaptation circuit 124, FIR filter adaptation circuit 126, and adaptation switch circuit 128. The corresponding functionality of the components of processing circuitry 112 be structurally realized/embodied as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Accordingly, while the individual components of processing circuitry 112 are depicted separately in FIG. 1, this depiction serves to highlight the operation of processing circuitry 112 on a functional level; consequently, one or more of the components of processing circuitry 112 may be integrated into a common hardware and/or software element. Additionally, the functionality of processing circuitry 112 detailed herein (in particular e.g. the formulas/equations, flow charts, and prose descriptions) may be readily incorporated by skilled persons into program code for retrieval from a non-transitory computer readable medium and execution by a processor.

Processing circuitry 112 may be logically divided into a signal path and an adaptation engine, where the signal path may be tasked with generating the estimated interference signal e(t) and the adaptation engine may be tasked with adapting the filter coefficients of PA filter circuit 118 and FIR filter circuit 120. Accordingly, the signal path may be composed of kernel generation circuit 114, matrix memory 116, PA filter circuit 118, FIR filter circuit 120, and cancelation circuit 122 while the adaptation engine may be composed of PA filter adaptation circuit 124, FIR filter adaptation circuit 126, and adaptation switch 128. Accordingly, the signal path may derive the kernel signals $X_{t:t-M+1}^{(k)}$ for each kernel k for each input sample s(t) and apply PA filter $W_{PA}$ to the kernel signals $X_{t:t-M+1}^{(k)}$ for each kernel k, thus producing a 1×M output vector $(W_{PA}^T X(t))$, before applying FIR filter $W_F$ to $W_{PA}^T X(t)$ (yielding $W_{PA}^T X(t) W_F$) to obtain the estimated interference samples e(t). The signal path may thus produce a sample of e(t) for each input sample of s(t) using the most recent M samples for each of the K kernels.

More specifically, kernel generation circuit 114 may obtain baseband transmit signal s(t) from the receive path at the input to power amplifier 104. Depending on the deployment of processing circuitry 112, signal source 102 may be a baseband modem or similar baseband processing circuit (e.g. in a mobile terminal implementation) or a baseband unit (BBU) or similar baseband processing circuit (e.g. in a base station or access point implementation). Accordingly, kernel generation circuit 114 may tap the input to PA 104 to obtain s(t) and may subsequently apply processing in order to derive the kernel samples $X_t^{(1:K)}$, i.e. the most recent kernel sample for each of the K kernels. As previously noted, kernel generation circuit 114 circuit may rely on a 'kernelized' model of PA 104 that estimates the non-linear response of PA 104 by dividing the response into multiple components, i.e. kernels, that collectively sum to model the overall response of PA 104. Such may include using e.g. Cholesky decomposition or similar established processing solution in order to derive $X_t^{(1:K)}$. Accordingly, kernel generation circuit 114 may be responsible for decomposing s(t) into the corresponding kernel samples $X_t^{(1:K)}$. Various such kernelization techniques are established and are compatible for implementation in kernel generation circuit 114.

Kernel generation circuit 114 may thus generate kernel samples $X_t^{(1:K)}$ for each sample s(t) and provide the resulting samples $X_t^{(1:K)}$ to matrix memory 116. As previously detailed, processing circuitry 112 may estimate the self-interference signal e(t) based on the M most recent samples (including the current sample at time t) of each of the K kernels, i.e. $X_{t:t-M+1}^{(1:K)}$. Accordingly, memory matrix 116 may store the K×M matrix containing the M most recent samples for each of the K kernels, which may be expressed as X(t) as defined in Equation (3) at each time t.

As processing circuitry 118 may generate an estimated self-interference sample e(t) at each time t, matrix memory 116 may update X(t) with the K new kernel samples $X_t^{(1:K)}$ for each time t and provide X(t) to PA filter circuit 118. PA filter circuit 118 may store the K filter weights of K×1 PA filter weight vector $W_{PA}$, which may be expressed as $$W_{PA} = \begin{bmatrix} w_{PA,1} \\ w_{PA,2} \\ \vdots \\ w_{PA,K} \end{bmatrix} \quad (5)$$

where each $w_{PA,k}$, k=1, ..., K is the complex PA weight corresponding to the k-th PA kernel.

PA filter circuit 118 may then apply $W_{PA}$ to X(t) as $W_{PA}^T X(t)$ to obtain M×1 vector, which PA filter circuit 118 may provide to FIR filter circuit 120. FIR filter circuit 120 may likewise store the M filter weights of M×1 filter weight vector $W_F$, which may be expressed as $$W_F = \begin{bmatrix} w_{F,t} \\ w_{F,t-1} \\ \vdots \\ w_{F,t-M+1} \end{bmatrix} \quad (6)$$

where each $w_{F,t-m}$, m=0, 1, ..., M−1 is the complex FIR weight corresponding to the m-th tap, i.e. the m-th most recent sample.

FIR filter circuit 120 may then apply $W_F$ to the output vector $W_{PA}^T X(t)$ of PA filter circuit 118 as $W_{PA}^T X(t) W_F$ to obtain a single estimated self-interference sample e(t) for each time t. Cancelation circuit 122 may then subtract e(t) from y(t) provided by receiver 110 to obtain clean signal z(t)=y(t)−e(t) for each time t, which may be largely free of self-interference if e(t) closely matches the actual self-interference signal leaking from power amplifier 104 through duplexer 106 on leakage path 130.

The efficacy of the self-interference cancelation scheme applied by processing circuitry 112 may depend on how accurately $W_{PA}$ and $W_F$ model the self-interference over each kernel and tap. Accordingly, processing circuitry 112 may employ the adaptation engine composed of PA filter adaptation circuit 124, FIR filter adaptation circuit 126, and adaptation switch circuit 128 in order to dynamically update the filter weights $W_{PA}$ and $W_F$ of PA filter circuit 118 and FIR filter circuit 120.

As the PA and FIR filter weights $W_{PA}$ and $W_F$ have been decoupled (compared to the 'coupled' weights of W in Equation (2)), the adaptation engine of processing circuitry 112 may be able to update $W_{PA}$ and $W_F$ separately, which may substantially reduce the computational complexity of the update process and consequently reduce hardware area and power requirements. Whereas update of the full K×M matrix W involved considering all KM filter weights for update, the adaptation engine may only need to consider either K or M total filter weights of $W_{PA}$ and $W_F$, respectively, at a time. Furthermore, such may provide the possibility to re-use shared processing circuitry to update $W_{PA}$ and $W_F$ at disparate times, thus allowing for further hardware reductions.

Figure 2:
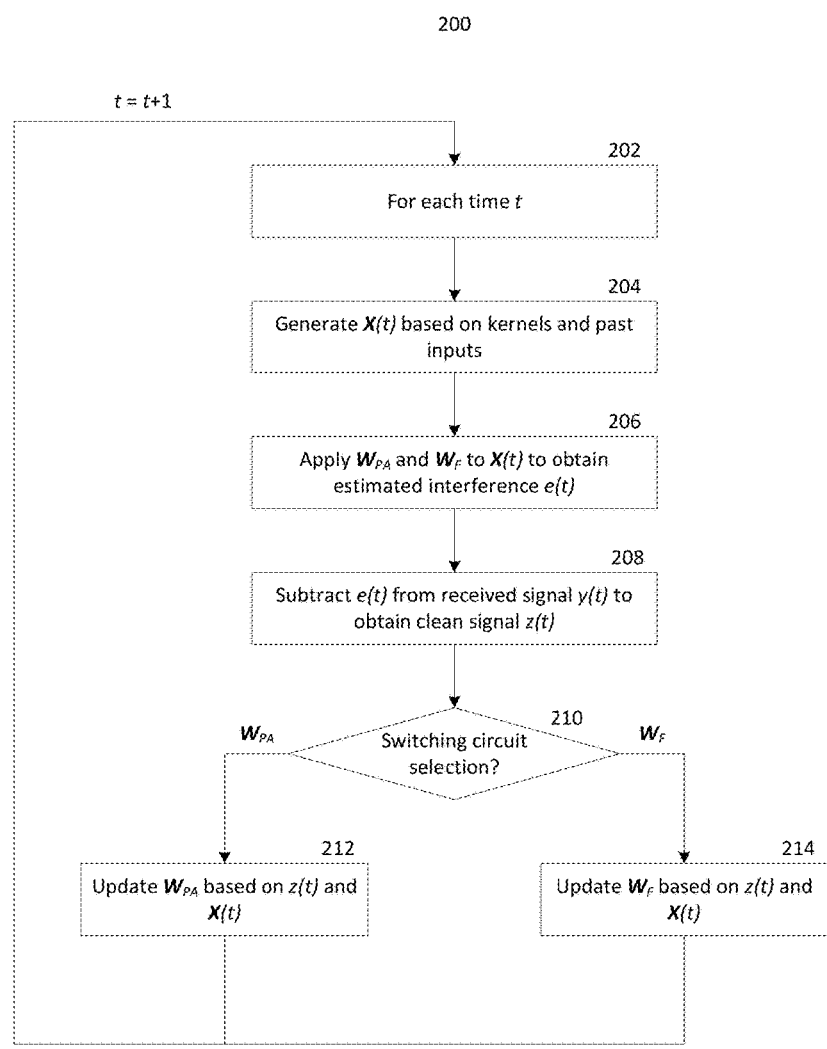
FIG. 2 shows a flow chart illustrating a self-cancelation interference procedure.

FIG. 2 shows method 200 illustrating the general procedure of processing circuitry 112, which may iterate over each time t starting at 202. Kernel generation circuit 114 and matrix memory 116 may first generate the KM entries of X(t) from s(t) based on the most recent kernel samples $X_t^{(1:K)}$ and the past kernel samples $X_{t-1:t-M+1}^{(1:K)}$ in 204. Each set of kernel samples $X_{t:t-M+1}^{(1:K)}$ may thus be considered a 'subsignal' derived from baseband input signal s(t), e.g. according to kernel generation scheme such as based on Cholesky decomposition. PA filter circuit 118 and FIR filter circuit 120 may then apply $W_{PA}$ and $W_F$, respectively, to X(t) as $W_{PA}^T X(t) W_F$ to obtain e(t) in 206. Cancelation circuit 122 may then subtract e(t) from received signal y(t) to obtain clean signal z(t) in 208. If switching circuit 128 has currently selected $W_{PA}$ for adaptation, PA filter adaptation circuit 124 may update $W_{PA}$ based on z(t) and X(t) in 212, i.e. by evaluating the uncanceled leakage in z(t) resulting from X(t); alternatively, if switching circuit 128 has currently selected $W_F$ for adaptation, FIR filter adaptation circuit 126 may update $W_F$ based on z(t) and X(t) in 214. Method 200 may then iteratively repeat for t=t+1, where switching circuit 128 may periodically change the selection between PA adaptation circuit 124 and FIR adaptation circuit 126 in order to ensure that both $W_{PA}$ and $W_F$ are updated over time.

The decoupling of $W_{PA}$ and $W_F$ updates may provide considerable reductions in computational complexity due to the reduced number of filter weights, which may also open up the possibility for re-using the same shared processing circuitry to update $W_{PA}$ and $W_F$ at alternating times (thus further saving hardware area). Additionally, the decoupling of $W_{PA}$ and $W_F$ may allow for processing circuitry 112 to also employ numerous additional computational techniques that further reduce the computational complexity. As will be further detailed below, such techniques may include a Dichotomous Coordinate Descent (DCD) update algorithm, simplified maximum magnitude selection, reduced matrix memory storage, preprocessing calculation stages, and clock pipelining schedules. The self-interference cancelation solution of this disclosure may additionally offer configurability in terms of the supported number of taps M and kernels K. Such enhancements are considered optional and may or may not be included in various aspects of this disclosure.

The general update procedure of the adaptation engine of processing circuitry 112 will first be detailed. As $W_{PA}$ and $W_F$ are decoupled into two separate vectors, the adaptation engine may update each of $W_{PA}$ and $W_F$ separately (as in 212 and 214 of method 200 depending on the selection of switching circuit 128). By updating only one of $W_{PA}$ or $W_F$ at a time, the adaptation engine may 'fix' one dimension (i.e. either the PA dimension or the FIR dimension) and ignore any dependencies on the fixed dimension during update of the other dimension, thus simplifying the adaptation process. Accordingly, switching circuit 128 may control PA filter adaptation circuit 124 and FIR filter adaptation circuit 126 to alternate between updating the PA weights of $W_{PA}$ and the FIR weights of $W_F$. Accordingly, only K or M filter weights will be considered for update at a given time (resulting directly from the decoupling), which may present a drastic reduction over the KM filter weights of W.

As previously indicated, the adaptation engine may utilize clean signal z(t) in order to decide which filter weights to update. More specifically, as shown in FIG. 1 both PA filter adaptation circuit 124 and FIR adaptation circuit 126 may receive both z(t) and X(t) (the clean signal sample z(t) and kernel sample matrix X(t) at time t) and compare z(t) with X(t) to determine if z(t) is correlated with X(t). Accordingly, if z(t) is correlated with X(t), this may indicate that the self-interference cancelation is not effective and that the filter weights need to be adjusted to obtain more accurate estimates in e(t). Depending on the specifics of the adaptation scheme used by the adaptation engine, PA filter adaptation circuit 124 and FIR adaptation circuit 126 may then analyze the relationship between z(t) with X(t) in order to identify one or more filter weights of $W_{PA}$ and $W_F$ to update. In optimal adaptation schemes, PA filter adaptation circuit 124 and FIR adaptation circuit 126 may determine an update for each weight of $W_{PA}$ and $W_F$, such as an optimal update for each weight to minimize the square error of an error signal (in the case of LMS) or to minimize a cost function (in the case of RLS). Accordingly, in certain aspects of this disclosure, the adaptation engine of processing circuitry 112 may update the filter weights of $W_{PA}$ and $W_F$ with an adaptation scheme, such as e.g. LMS or RLS, which may include switching circuit 128 alternating between update of $W_{PA}$ and $W_F$ by activating one of either PA filter adaptation circuit 124 or FIR filter adaptation circuit 126 at a time. Accordingly, one of either $W_{PA}$ and $W_F$ will be updated during each update iteration at time t and the weight adjustments will be reflected in application of $W_{PA}$ and $W_F$ to X(t+1) by PA filter circuit 118 and FIR filter circuit 120.

While application of such optimal update schemes (i.e. to update each filter weight) to the decoupled filters $W_{PA}$ and $W_F$ is within the scope of the solution presented in this disclosure, such schemes may be overly complex due to the need to calculate an update for each filter weight. Accordingly, the adaptation engine may instead select a reduced number of filter weights (i.e. only some of the filter weights) to update at a time. For example, in update iterations where PA filter adaptation circuit 124 is activated by switching circuit 128 (and thus FIR filter adaptation circuit 126 is deactivated), PA filter adaptation circuit 124 may compare z(t) and X(t) and identify a single weight of $W_{PA}$ that makes the greatest contribution to the self-interference residue remaining in z(t), i.e. that is 'most accountable' for un-canceled self-interference in z(t). PA filter adaptation circuit 124 may then only calculate an update for the identified weight of $W_{PA}$ during the current update iteration. If switching circuit 128 selects to update $W_{PA}$ again during the next update iteration, PA filter adaptation circuit 124 may compare z(t+1) and X(t+1) (i.e. the clean signal and kernel matrix for the next time t+1) and again select a single weight of $W_{PA}$ to update. As the update occurs at the next time t+1, the clean signal z(t+1) may reflect the change in $W_{PA}$ as e(t+1) will directly depend on the updated weight. FIR filter adaptation circuit 126 may similarly select single weights of $W_F$ to update during each update iteration for which FIR filter adaptation circuit 126 is activated by switching circuit 128.

Accordingly, instead of updating all or some of the filter weights of $W_{PA}$ and $W_F$ during each update iteration, the adaptation engine may select only one weight of $W_{PA}$ or $W_F$ (depending on the selection by switching circuit 128) to update during each update iteration. Such adaptation schemes are commonly known as Coordinate Descent (CD), where updates are made in only a single direction at a time. As previously detailed regarding LMS and RLS, adaptive algorithms may aim to reduce a squared error term or a cost function; accordingly, LMS-CD may update a single weight in order to reduce the squared error term while RLS-CD may update a single weight in order to reduce a cost function. While the adaptation engine of processing circuitry 112 may employ any of a number of different adaptation schemes to update $W_F$ and $W_{PA}$, an advantageous solution of this disclosure may utilize an RLS-DCD scheme in which a single weight of $W_F$ or $W_{PA}$ (depending on the current selection of switching circuit 128) is updated using a single bit-inversion in order to minimize a cost function derived from X(t) and z(t). Accordingly, in each update iteration, the appropriate adaptation engine (PA filter adaptation circuit 124 or FIR filter adaptation circuit 126) may evaluate X(t) and z(t) to identify which filter weight (of $W_{PA}$ or $W_F$) is the worst-offender in terms of uncanceled leakage in z(t) and to identify which bit of a binary representation of the selected weight should be inverted, or 'flipped', in order to reduce the cost function. Accordingly, this single-bit inversion update of a single weight may yield the 'Dichotomous' Coordinate Descent nomenclature while the minimization of a cost function (namely the uncanceled residue in z(t) represented by the cross-correlation between X(t) and z(t)) may yield the RLS designation. It is nevertheless noted that other adaptation algorithms may be integrated mutatis mutandis in place of the RLS-DCD algorithm to update the decoupled weights of $W_{PA}$ and $W_F$.

Figure 3:
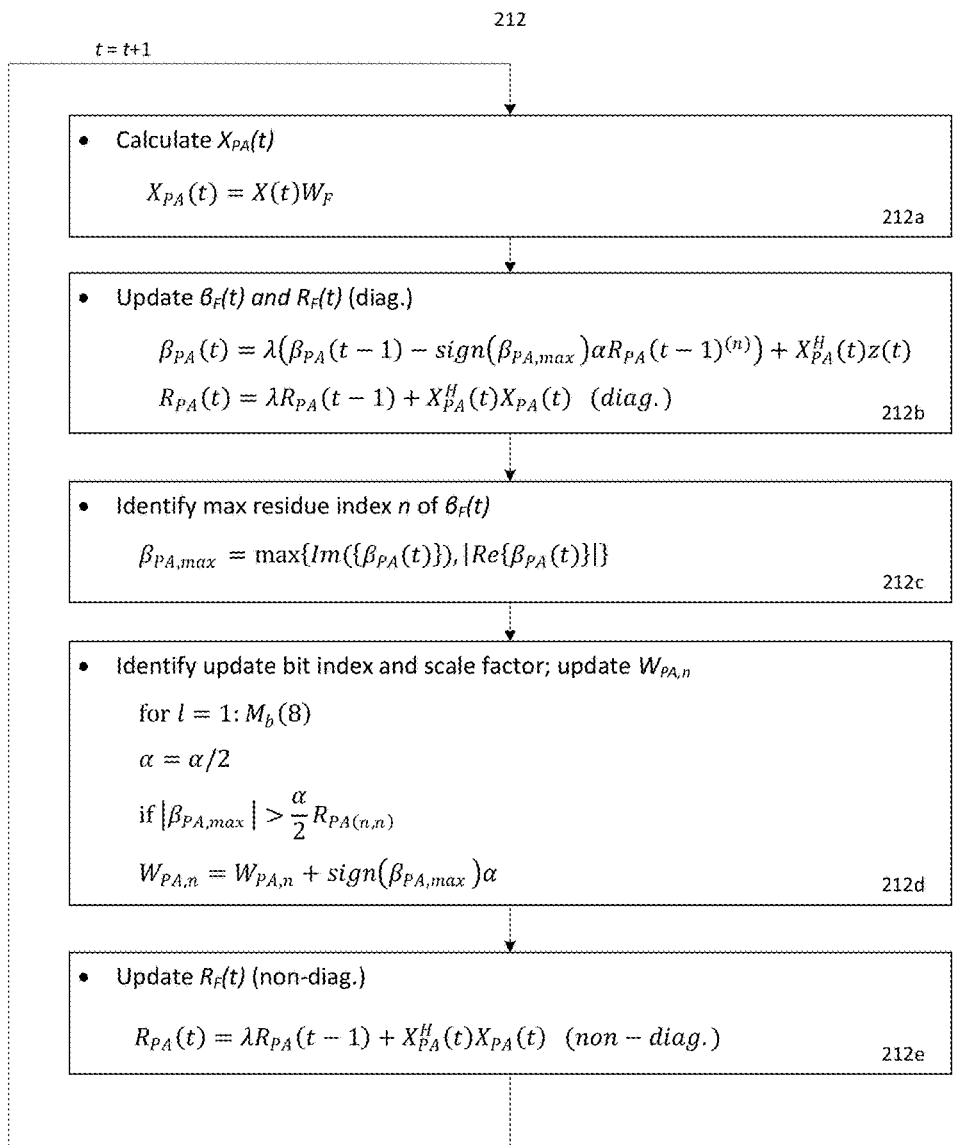
FIG. 3 shows a flow chart illustrating update of a kernel dimension filter.
Figure 4:
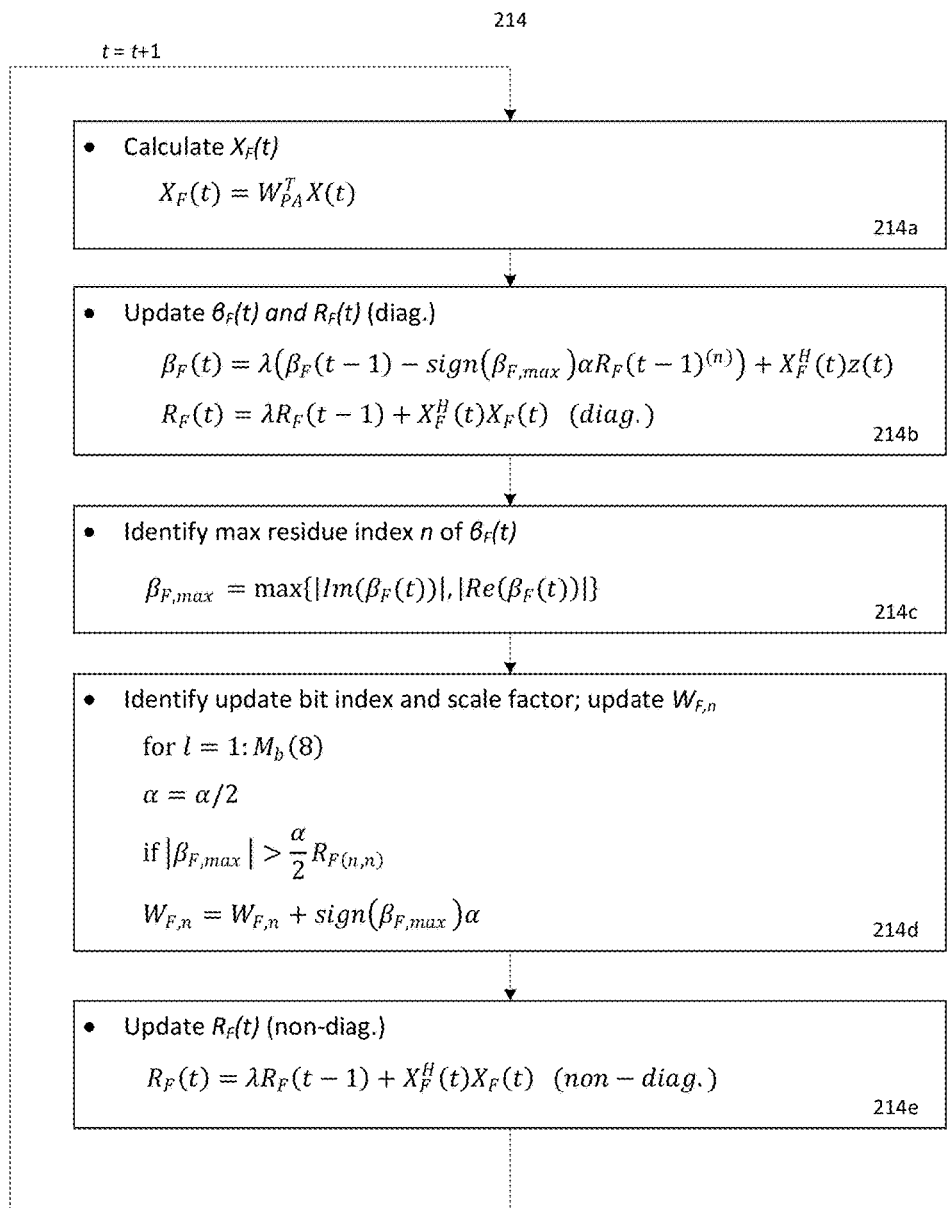
FIG. 4 shows a flow chart illustrating update of a delay tap dimension filter.

FIGS. 3 and 4 further illustrate the update iterations 212 and 214 of method 200, where PA filter adaptation circuit 124 and FIR filter adaptation circuit 126 may respectively update $W_{PA}$ and $W_F$ depending on the current selection by switching circuit 128. PA update iteration 212 may involve largely identical calculations to FIR update iteration 214, where the only substantial difference involves the calculation of the decoupled input signals $X_{PA}(t)$ and $X_F(t)$. As will be later detailed, the adaptation engine may thus be able to re-use the same shared circuitry for update iterations 212 and 214. Without loss of generality, the context depicted in FIGS. 3 and 4 and detailed below corresponds to a RLS-DCD adaptation algorithm in which where PA filter adaptation circuit 124 and FIR filter adaptation circuit 126 aim to minimize the uncanceled leakage residue in z(t) by selecting a single bit to invert of a selected filter weight of $W_{PA}$ or $W_F$. However, other adaptation algorithms, such as based on LMS, CD, gradient descent, etc., may also be employed to update $W_{PA}$ and $W_F$ in a decoupled manner while remaining within the scope of this disclosure.

As shown in FIG. 3, PA filter adaptation circuit 124 may first calculate decoupled PA input signal $X_{PA}(t)$ in 212a as $X_{PA}(t)=X(t)W_F$, where $X_{PA}(t)$ is of dimension 1×K and each k-th element of $X_{PA}(t)$ is representative of the M taps of the k-th kernel of X(t). Accordingly, PA filter adaptation circuit 124 may 'fix' the weights of $W_F$ and only pursue update of $W_{PA}$. As previously indicated, PA filter adaption circuit 124 may compare X(t) to z(t) in order to identify which weights of $W_{PA}$ are contributing to uncanceled leakage in z(t). More specifically, PA filter adaptation circuit 124 may utilize the cross-correlation $\beta_{PA}(t)$ between $X_{PA}(t)$ and z(t) in order to identify which elements of $X_{PA}(t)$ are substantially correlated with z(t), thus allowing PA filter adaptation circuit 124 to identify the weights of $W_{PA}$ corresponding to the correlated elements of $X_{PA}(t)$ as requiring update. As PA filter adaptation circuit 124 may need the correlations $R_{PA}(t)$ between each of the samples of $X_{PA}(t)$ in order to calculate the proper update, PA filter adaptation circuit 124 may also calculate correlation matrix $R_{PA}(t)$.

Accordingly, in 212b PA filter adaptation circuit 124 may calculate cross-correlation vector $\beta_{PA}(t)$ (of dimension 1×M) in 212b as $$\beta_{PA}(t)=\lambda(\beta_{PA}(t-1)-\text{sign}(\beta_{PA,max})\alpha R_{PA}(t-1)^{(n)})+X_{PA}^{H}(t)z(t) \quad (7)$$

and correlation matrix $R_{PA}(t)$ as $$\beta_{PA}(t)=\lambda\beta_{PA}(t-1)+X_{PA}^{H}(t)X_{PA}(t)(\text{diag.}) \quad (8)$$

where $\lambda$ is a forgetting factor, $\text{sign}(\beta_{PA,max})\alpha R_{PA}(t-1)^{(n)}$ is an update vector that updates $\beta_{PA}(t)$ according to the filter weight update of the n-th element of $W_{PA}$ from the previous iteration at t−1, and (diag.) indicates that only the diagonal elements of $R_{PA}(t)$ are updated. As will be later detailed, $R_{PA}(t-1)^{(n)}$ may be the n-th column vector of $R_{PA}(t-1)$, where n corresponds to the index of $W_{PA}$ that was updated at the iteration for time t−1. As will also be later detailed, the diagonal and non-diagonal elements of $R_{PA}(t)$ may be performed separately in order to support for an effective hardware pipeline schedule, e.g. where the diagonal elements of $R_{PA}(t)$ are updated first in 212b and are later followed by update of the non-diagonal elements of $R_{PA}(t)$ in 212e (e.g. where the diagonal elements of $R_{PA}(t)$ are part of the critical path and thus should be processed before the non-diagonal elements to optimize performance). However, in certain aspects of this disclosure all elements of $R_{PA}(t)$ may alternatively be updated in a single procedure. As the update vector $\text{sign}(\beta_{PA,max})\alpha R_{PA}(t-1)(n)$ depends on the previous update iteration, PA filter adaptation circuit 124 may calculate $\beta_{PA}(t)$ in the first update iteration as $\lambda\beta_{PA}(t-1)+X_{PA}^{H}(t)z(t)$, where $\beta_{PA}(t-1)$ is the initialization value of $\beta_{PA}$ (which may be set to e.g. a zero matrix). $R_{PA}(t-1)$ may likewise be the initialization value of $R_{PA}$.

Accordingly, $\beta_{PA}(t)$ may indicate the cross-correlation between decoupled PA input signal $X_{PA}(t)$ and clean signal z(t), which thus indicates the residual uncanceled leakage attributed to each weight of $W_{PA}$. Accordingly, inaccurate weights of $W_{PA}$ (i.e. weights that do not accurately characterize the corresponding kernel) will produce corresponding elements of $\beta_{PA}(t)$ that have high magnitude. As the goal of PA filter adaptation circuit 124 is to minimize $\beta_{PA}(t)$ (i.e. $\beta_{PA}(t)$ is the RLS cost function), PA filter adaptation circuit 124 may thus aim to update the weights of $W_{PA}$ in order to reduce $\beta_{PA}(t)$, thus reducing the uncanceled leakage residue in z(t).

As previously indicated, in an RLS-DCD context PA filter adaptation circuit 124 may select a single weight of $W_{PA}$ based on $\beta_{PA}(t)$ and invert a single bit of $W_{PA}$ in order to minimize $\beta_{PA}(t)$. This may be computationally simpler than e.g. updating each weight of $W_{PA}$ and/or calculating an optimum update for each updated weight of $W_{PA}$. As the weights of $W_{PA}$ that make the greatest contribution to uncanceled residue will correspond to the elements of $\beta_{PA}(t)$ with the highest magnitude, PA filter adaptation circuit 124 may in 212c identify the element $\beta_{PA,max}$ of $\beta_{PA}(t)$ having the highest magnitude and the corresponding index n (n∈{1, . . . , K}) of $\beta_{PA,max}$ within $\beta_{PA}(t)$, which PA filter adaptation circuit 124 may then apply to update the n-th weight of $W_{PA}$. As the elements of $\beta_{PA}(t)$ may be complex, in an optimal scenario PA filter adaptation circuit 124 may in 212c calculate the Euclidean norm of each element of $\beta_{PA}(t)$ and identify the element with the highest magnitude, i.e. $\max(|\beta_{PA}(t)|)$. However, as such may involve the computation of a squares and square roots ($|a+jb|=\sqrt{a^2+b^2}$), PA filter adaptation circuit 124 may simplify the computation in 212c by identifying the element of $\beta_{PA}(t)$ with the highest real or imaginary part as $\beta_{PA,max}$ (located at index n in $\beta_{PA}(t)$), i.e.

$$\beta_{PA,max} = \max\{|Im\{\beta_{PA}(t)\}|, |Re\{\beta_{PA}(t)\}|\} \quad (9)$$

Accordingly, while Equation (9) is an approximation such may still allow PA filter adaptation circuit 124 to identify an element of $\beta_{PA}(t)$ with the highest real or imaginary part, which may likely be one of the highest if not the highest-magnitude elements of $\beta_{PA}(t)$. PA filter adaptation circuit 124 may thus identify $\beta_{PA,max}$ and the corresponding index n of $\beta_{PA,max}$ in $\beta_{PA}(t)$, which may correspond to the n-th weight of $W_{PA}$ thus resulting in PA filter adaptation circuit 124 identifying the weight of $W_{PA}$ that is selected for update.

PA filter adaptation circuit 124 may then update the n-th weight of $W_{PA}$, $w_{PA,n}$, based on $\beta_{PA,max}$ and correlation matrix $R_{PA}(t)$. In a conventional RLS-CD update solution (i.e. non-Dichotomous), PA filter adaptation circuit 124 may update $w_{PA,n}$ in 212d as $w_{PA,n} = w_{PA,n} \mp \beta_{PA,max}/R_{PA(n,n)}$, i.e. by performing a division of $\beta_{PA,max}$ by the correlation value $R_{PA(n,n)}$ of the n-th element of $X_{PA}(t)$ with itself (located at the n-th diagonal term of $R_{PA}$), which may provide the optimal minimization of $\beta_{PA}(t)$ as achieved by update of a single weight. Without loss of generality, PA filter adaptation circuit 124 may alternatively avoid the computational complexity of the divisional operation by instead selecting a single bit of w (i.e. to flip from a 0 to 1 or vice versa). As $R_{PA(n,n)}$ is located on the diagonal of $R_{PA}(t)$, PA filter adaptation circuit 124 may thus need to ensure that the diagonal entries of $R_{PA}(t)$ are up-to date at 214d. As the non-diagonally entries of $R_{PA}(t)$ will then be used in 214e to update $R_F(t)$, PA filter adaptation circuit 124 may separate the update of $R_{PA}(t)$ into diagonal and non-diagonal portions in order to enable a pipelined clock schedule that shares computational elements.

As expressed in the algorithmic logic of 212d in FIG. 3, PA filter adaptation circuit 124 may check each of the $M_b$ bits of $w_{PA,n}$ in order to identify which of the bits would optimally minimize $\beta_{PA}(t)$ if inverted. Accordingly, for e.g. $M_b=8$, this may amount to a subtraction of 1, 2, 4, 8, ..., or 128 from $w_{PA,n}$ (i.e. $2^0, 2^1, \ldots, 2^7$). As the optimal update to $w_{PA,n}$ is $-\beta_{PA,max}/R_{PA(n,n)}$, PA filter adaptation circuit 124 may aim to determine in 212d which of the possible subtraction values from $2^{M_b-1}$ to $2^0$ that $\beta_{PA,max}/R_{PA(n,n)}$ is closest to. Accordingly, starting with e.g. $\alpha=2^{M_b}$ (although the initiating value of $\alpha$ may be a design parameter and other values other than the most significant bit could be chosen, such as e.g. the second-most significant bit, third-most significant bit, etc.), PA filter adaptation circuit 124 may iterate from l=1 to L=$M_b$ (e.g. $M_b=8$) in order to determine which $$\frac{\alpha}{2}$$

satisfies the condition $$|\beta_{PA,max}| > \frac{\alpha}{2} R_{PA(n,n)}$$

and, upon identifying the appropriate $$\frac{\alpha}{2},$$

take $\alpha$ as the update value for $w_{PA,n}$. By identifying the first $\alpha$ for which $$|\beta_{PA,max}| > \frac{\alpha}{2} R_{PA(n,n)}, \text{ or } \frac{|\beta_{PA,max}|}{R_{PA(n,n)}} > \frac{\alpha}{2},$$

PA filter adaptation circuit 124 may identify the $\alpha$ closest in value to $\beta_{PA,max}/R_{PA(n,n)}$, i.e. the optimum update of $w_{PA,n}$ to minimize $\beta_{PA}(t)$. In other words, starting from a possible set of update values $2^{M_b-1}$ to $2^0$, PA filter adaptation circuit 124 may identify which update value is closest to the optimum update value $\beta_{PA,max}/R_{PA(n,n)}$ and select the identified update value as $\alpha$. Flipping the l-th bit (where l gives the iteration for which $$|\beta_{PA,max}| > \frac{\alpha}{2} R_{PA(n,n)}$$

is satisfied) may thus produce an update of $\alpha$ (positive or negative depending on the sign of $\beta_{PA,max}$).

Upon identifying update factor $\alpha$, PA filter adaptation circuit 124 may flip the l-th LSB bit of $w_{PA,n}$ to update $w_{PA,n}$ as $$w_{PA,n} = w_{PA,n} + \text{sign}(\beta_{F,max})\alpha \quad (10)$$

where $\text{sign}(\beta_{F,max})$ preserves the sign of $\beta_{F,max}$ to ensure that $w_{PA,n}$ is updated in the proper direction.

Accordingly, upon completion of the update of $w_{PA,n}$ in 212d, PA filter adaptation circuit 124 may have selected the 'worst offender' $w_{PA,n}$ of $W_{PA}$, i.e. the weight of $W_{PA}$ with the highest contribution (based on having the maximum real or imaginary part) to the uncanceled residue in z(t) and invert a single bit of the selected weight $w_{PA,n}$ in order to minimize $\beta_{PA}(t)$, which in connection also minimizes the leakage residue in z(t). PA filter adaptation circuit 124 may then complete the update iteration for time t by updating the non-diagonal elements of $R_{PA}(t)$ in 212e as $$R_{PA}(t) = \lambda R_{PA}(t-1) + X_{PA}^H(t) X_{PA}(t) \text{(non-diag)} \quad (11)$$

As previously indicated, as the update of $\beta_{PA}(t)$ in 212b requires the off-diagonal elements of $R_{PA}(t-1)$ for the n-th column $R_{PA}(t-1)^{(n)}$, PA filter adaptation circuit 124 may perform the off-diagonal update in 212e separately in order to re-use computational hardware for both 212b and 212e.

Assuming switching circuit 128 proceeds to t+1 with PA filter adaptation circuit 124 still selected, PA filter adaptation circuit 124 may repeat 212 for t=t+1. Switching circuit 128 may be configured to maintain the update selection of PA filter adaptation circuit 124 or FIR filter adaptation circuit 126 for multiple iterations before switching, which may include maintaining the selection of either PA filter adaptation circuit 124 or FIR filter adaptation circuit 126 until the selected filter $W_{PA}$ or $W_F$ converges or switching between PA filter adaptation circuit 124 or FIR filter adaptation circuit 126 according to a predetermined cyclic number of update iterations (e.g. every other iteration, every 3 iterations, every 10 iterations, etc.). Accordingly, PA filter adaptation circuit 124 may continue to update $W_{PA}$ during each iteration by calculating a new $X_{PA}(t)$ based on the new X(t) matrix in 212a, updating $\beta_{PA}(t)$ and $R_{PA}(t)$ in 212b, identifying the maximum element $\beta_{PA,max}$ of $\beta_{PA}(t)$ and corresponding index n in 212c, selecting a bit to flip of $w_{PA,n}$ by determining a in 212d, and completing update of $R_{PA}(t)$ in 212e.

Conversely, when switching circuit 128 selects FIR filter adaptation circuit 126 for update, FIR filter adaptation circuit 126 may execute the FIR update iteration 214 as shown in FIG. 4. FIR filter adaptation circuit 126 may thus calculate decoupled FIR input signal $X_F(t)$ in 214a as $X_F(t) = W_{PA}^T X(t)$, where $X_F(t)$ is of dimension 1×M and each m-th element represents the joint contribution of all K kernels to the m-th taps X(t). Likewise to PA update iteration 212, FIR filter adaptation circuit 126 may be configured to evaluate the cross-correlation $\beta_F(t)$ between $X_F(t)$ and z(t) in order to identify which taps of $X_F(t)$ are most correlated with z(t), thus identifying which taps of $W_F$ are the 'worst-offenders' in terms of uncanceled residual leakage in z(t). As these taps are accordingly the least accurate, in accordance with RLS-DCD FIR filter adaptation circuit 126 may proceed to select the least accurate tap $w_{F,n}$ and flip a single bit of $w_{F,n}$ to reduce $\beta_F(t)$, thus reducing the uncanceled leakage in z(t).

Accordingly, in 214b FIR filter adaptation circuit 126 may calculate cross-correlation vector $\beta_F(t)$ (of dimension 1×M) as $$\beta F(t) = \lambda(\beta_F(t-1) - \text{sign}(\beta_{F,max})\alpha R_F(t-1)^{(n)}) + X_F^H(t)z(t) \quad (12)$$

and correlation matrix $R_F(t)$ as $$R_F(t) = \lambda R_F(t-1) + X_F^H(t)X_F(t) \text{(diag.)} \quad (13)$$

where, likewise to PA update iteration 212, A is a forgetting factor, $\text{sign}(\beta_{F,max})\alpha R_F(t-1)^{(n)}$ is an update vector that updates $\beta_F(t)$ according to the filter weight update of the n-th element $W_{F,n}$ of $W_F$ from the previous iteration at t−1 (with the n-th column of $R_F(t)$), and (diag.) indicates that only the diagonal elements of $R_F(t)$ are updated. Likewise to above, FIR filter adaptation circuit 126 may update the diagonal and non-diagonal elements of $R_F(t)$ separately in order to support a hardware pipeline clock schedule that re-uses computational hardware for 214b and 214e; however, in various aspects of this disclosure FIR filter adaptation circuit 126 may alternatively update all elements of $R_F(t)$ in a single procedure. As the update vector $\text{sign}(\beta_{F,max})\alpha R_F(t-1)^{(n)}$ depends on the previous update iteration, FIR filter adaptation circuit 124 may calculate $\beta_F(t)$ in the first update iteration as $\lambda\beta_F(t-1) + X_F^H(t)z(t)$, where $\beta_F(t-1)$ is the initialization value of $\beta_F$ (which may be set to e.g. a zero matrix). $R_F(t-1)$ may likewise be the initialization value of $R_F$.

As in PA update iteration 212, $\beta_F(t)$ may represent the cross-correlation between each tap of decoupled FIR input signal $X_F(t)$ and clean signal z(t). Accordingly, FIR filter adaptation circuit 126 may aim to identify the element of $\beta_F(t)$ with the highest magnitude, which may point to the element of $W_F$ that is least accurate. FIR filter adaptation circuit 126 may thus identify index n of the maximum-valued element of $\beta_F(t)$ in 214c as $$\beta_{F,max} = \max\{|Im\{\beta_F(t)\}|, |Re\{\beta_F(t)\}|\} \quad (14)$$

As detailed above regarding 212c, identifying the element $\beta_{F,max}$ of $\beta_F(t)$ with the highest real or imaginary part may be less computationally complex than calculating the magnitude (e.g. L2 norm) of each element of $\beta_F(t)$. The approximation of Equation (14) may nevertheless generally identify $\beta_{F,max}$ as an element of $\beta_F(t)$ that has one of the highest magnitudes.

FIR filter adaptation circuit 126 may thus identify $\beta_{F,max}$ and the index n of $\beta_{F,max}$ within $\beta_F(t)$, where index n also corresponds to the index of the weight $w_{F,n}$ of $W_F(t)$ that is the 'worst offender' and thus needs to be updated. Likewise as to 212d, FIR filter adaptation circuit 126 may in 214d select a single bit of $w_{F,n}$ to flip in order to minimize $\beta_F(t)$. As the optimum update value of $w_{F,n}$ is given as $\beta_{F,max}/R_{F(n,n)}$, FIR filter adaptation circuit 126 may identify the scale factor $\alpha \in (2^0, 2^1, \ldots, 2^{M_b-1})$ (each corresponding to flipping the l-th bit of $w_{F,n}$ for $l=1, 2, \ldots, M_b$) to adjust $w_{F,n}$ by.

Accordingly, as shown in FIG. 4, in 214d FIR filter adaptation circuit 126 may check the condition $$|\beta_{F,max}| > \frac{\alpha}{2} R_{F(n,n)} \text{ for } \alpha = 2^{M_b-1} \text{ to } 2^0$$

and, if the condition is satisfied, take the current value of $\alpha$ as being closest to the optimum update value $\beta_{F,max}/R_{F(n,n)}$ and update $w_{F,n}$ as $$w_{F,n} = w_{F,n} + \text{sign}(\beta_{F,max})\alpha \quad (15)$$

thus updating $W_F$ to minimize the uncanceled leakage residue indicated by $\beta_F(t)$.

FIR filter adaptation circuit 126 may then update the off-diagonal elements of $R_F(t)$ as $$R_F(t) = \lambda R_F(t-1) + X_F^H(t)X_F(t) \text{(non-diag.)} \quad (16)$$

As in the case of PA filter adaptation circuit 124 noted above, FIR filter adaptation circuit 126 may then proceed to update $W_F(t)$ in the next iteration for t=t+1 with X(t+1) and z(t+1) if switching circuit 128 maintains the selection of FIR filter adaptation circuit 126.

As update of PA filter $W_{PA}$ and FIR filter $W_F$ are decoupled, each of PA filter adaptation circuit 124 and FIR filter adaptation circuit 126 may be able to compute updates to $W_{PA}$ and $W_F$ in an isolated environment, i.e. without having to account for the other dimension. The computational requirements required for each update may be substantially reduced in comparison with the two-dimensional case of the K×M filter matrix W noted above regarding the existing solution. In particular, the computational complexity of the correlation matrices $R_{PA}$ and $R_F$ may be markedly diminished. More specifically, in the existing solution the adaptation engine may be required to compute a KM×KM correlation matrix R that represents the correlations between each M taps of each K kernels. In contrast, the adaptation engine of processing circuitry 112 may only need to calculate K×K PA correlation matrix $R_{PA}$ and M×M FIR correlation matrix $R_F$. Furthermore, instead of applying the K×M filter W to X(t) as in the existing solution, the signal path of processing circuitry 112 may only apply a K×1 PA filter vector $W_{PA}$ and M×1 FIR filter vector $W_F$.

Various advantageous modifications have been noted above regarding processing circuitry 112, including the use of RLS-DCD (as opposed to gradient descent, traditional coordinate descent, etc.) and identifying the maximum magnitude on account of the highest real or imaginary component. These simplifications are optional, and may or may not be utilized along with the decoupled filter application and adaptation while still remaining within the scope of this disclosure. The adaptation engine may optionally also employ a variety of further techniques in order to reduce the required computational complexity, including reduced matrix storage, preprocessing calculation stages, and specific pipelining schedules that allow for re-use of hardware during different clock cycles.

Figure 5:
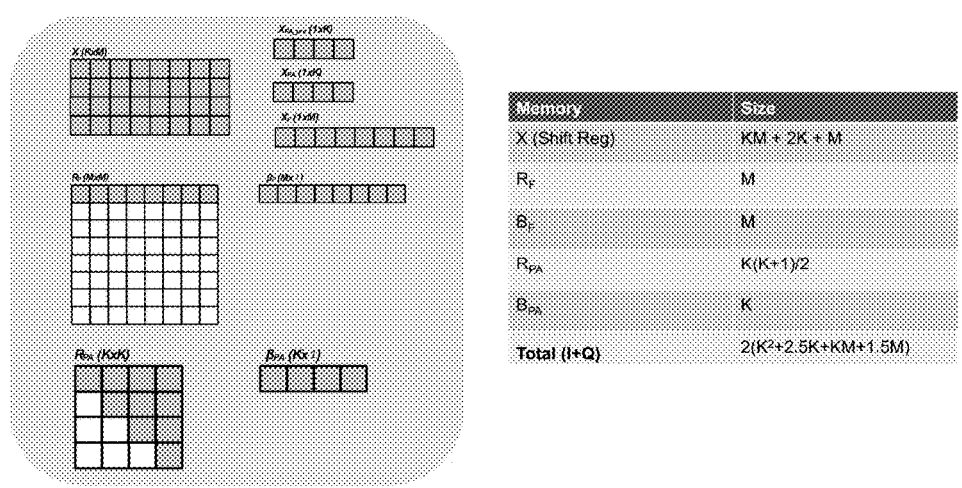
FIG. 5 shows a graphical depiction of a matrix storage scheme.

FIG. 5 shows a matrix memory storage scheme that the adaptation engine of processing circuitry 112 may employ in order to both reduce the amount of required memory and required calculations during each PA and FIR update iteration in 212 and 214, respectively. As previously indicated, matrix memory 116 may store the M most recent samples for each of the K kernels, which as shown in FIG. 1 may also be provided to PA filter adaptation circuit 124 and FIR filter adaptation circuit 126 for calculation of $X_{PA}(t)$, $X_F(t)$, $R_{PA}(t)$, $R_F(t)$, $\beta_{PA}(t)$, and $\beta_F(t)$.

Figure 6:
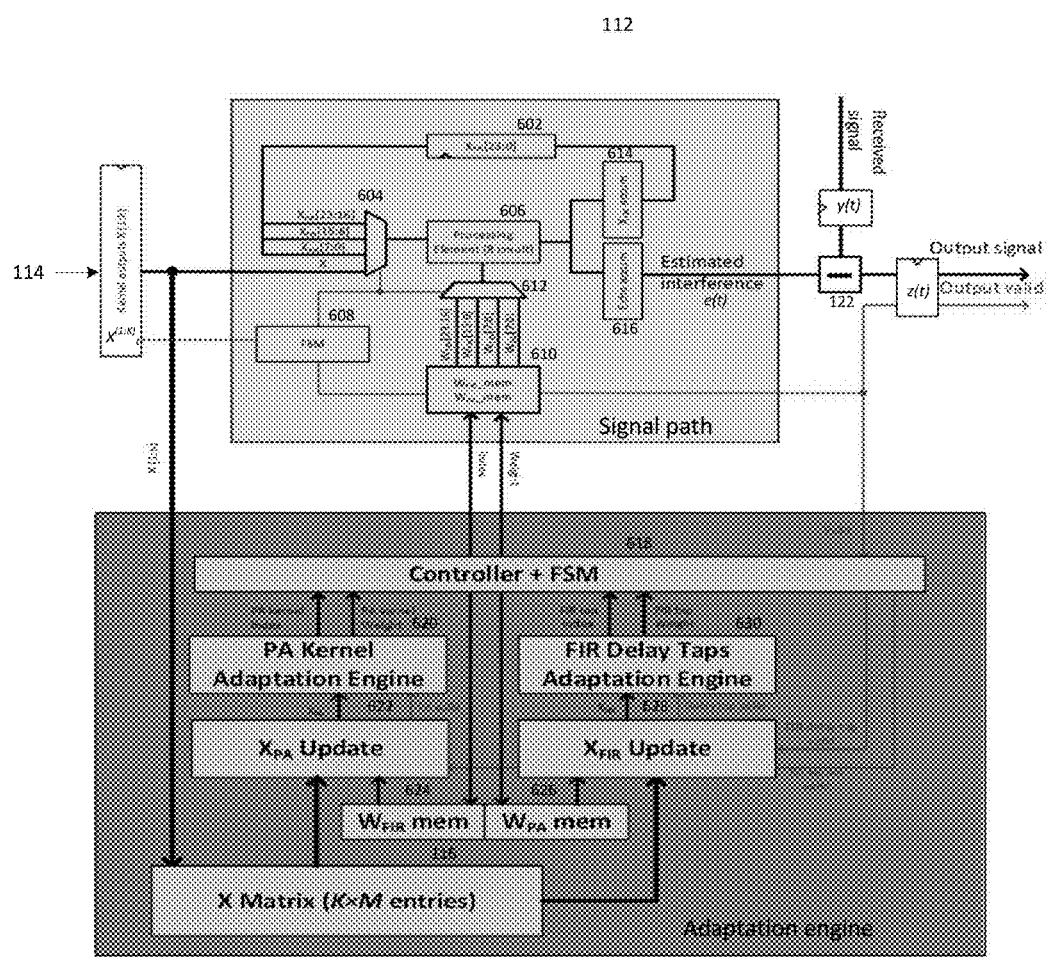
FIG. 6 shows a diagram of processing circuitry including a signal path and an adaptation engine.

FIG. 6 shows a more detailed architecture of processing circuitry 112, which may correspond to the matrix storage scheme of FIG. 5. As shown in FIG. 6, kernel generation circuit 114 may provide the kernel outputs $X_t^{(1:K)}$ for time t to the signal path and adaptation engine of processing circuitry 112. In the implementation of FIG. 6, matrix memory 116 may be located in the adaptation engine and accordingly may store the KM samples $X_{t:t-m+1}^{(1:K)}$ for use in updating $W_{PA}$ and $W_F$. This K×M storage is thus reflected in the matrix storage scheme of FIG. 5. Likewise, FIR filter memory 624 and PA filter memory 626 may each store the respective M and K weights of $W_F$ and $W_{PA}$, which may similarly be stored at filter memory 610 of the signal path.

In a general description of the operation of processing circuitry 112 as shown in FIG. 6, processing element 606 may apply $W_{PA}$ and $W_F$ to X(t) as previously detailed. In order to reduce hardware complexity and area, processing element 606 may utilize a pipelined approach in order to apply $W_{PA}$ and $W_F$ to X(t). In the example of FIG. 6, processing element 606 may be composed of e.g. 8 complex multipliers and 7 complex adders and may apply $W_{PA}$ and $W_F$ to X(t) over four cycles (although it is noted that numerous other implementations including a full, single-cycle (i.e. non-pipelined) implementation are within the scope of this disclosure). As noted above, processing element 606 may calculate e(t) as $W_{PA}^T X(t) W_F$, which processing element 606 may perform over e.g. four clock cycles for M=24 and K=8 as a. Clock cycle 1: Compute $X_{F,t}(t) = \Sigma_{i=1}^{8} X_t^{(i)}(t) w_{PA,i}$ b. Clock cycle 2: Compute $EEC_{acc(m=1:8)} = \Sigma_{i=1}^{8} X_{F,t-i+1}(t) w_{F,i}$ c. Clock cycle 3: Compute $EEC_{acc(m=1:16)} = \Sigma_{i=9}^{16} X_{F,t-i+1}(t) w_{F,i} + EEC_{acc(m=1:8)}$ d. Clock cycle 4: Compute $EEC_{acc(m=1:24)} = \Sigma_{i=17}^{24} X_{F,t-i+1}(t) w_{F,i} + EEC_{acc(m=1:16)}$ where $e(t) = EEC_{acc(m=1:24)}$, $X_{F,t}(t)$ is the sample of $X_F(t)$ for time t, and $EEC_{acc(m=1:24)}$ denotes the accumulated estimated echo.

Accordingly, processing element 606 may calculate the most recent sample $X_{F,t}(t)$ of $X_F(t)$ in clock cycle 1 by applying $W_{PA}$ to the K samples of X(t) for time t, i.e. the kernel samples for each of the K kernels. As denoted in clock cycle 1 above, processing element 606 may apply 8 complex multipliers to calculate $X_t^{(i)}(t) w_{PA,i}$ for i=1, . . . , 8 and provide each intermediate product to accumulation circuit 614, which may sum each intermediate product to obtain $X_{F,t}(t)$. Accumulation circuit 614 may then provide each $X_{F,t}(t)$ to register 602, which may hold the M samples of $X_F(t)$, e.g. as a first-in-first-out buffer where the oldest sample from time t−M is pushed out and the newest sample for time t is entered. Accordingly, the signal path of processing circuit 112 may avoid performing the entire multiplication of $X_F(t) = W_{PA}^T X(t)$ and instead calculate a single sample $X_{F,t}(t)$ at each time t and store the results in register 602.

Processing element 606 may then calculate e(t) in clock cycles 2-4 by applying $W_F(t)$ to $X_F(t)$. As detailed above for clock cycles 2-4, processing element 606 may employ the 8 complex multipliers to calculate 8 samples $X_{F,t-i+1} w_{F,i}$ for i=1:8, i=9:16, and i=17:24. Processing element 606 may provide each of the intermediate products $X_{F,t-i+1} w_{F,i}$ to accumulation circuit 616, which may sum each of the 8 intermediate products for each clock cycle to obtain e(t) as the accumulated estimated echo $EEC_{acc(m=1:24)}$. Accumulation circuit 616 may then provide e(t) to cancelation circuit 122, which may then subtract e(t) from received signal y(t) to obtain clean signal z(t). Depending on the accuracy of $W_{PA}$ and $W_F$, clean signal z(t) may be largely free of self-interference.

As shown in FIG. 6, multiplexers 604 and 612 may provide the appropriate selection of 8 samples from $X_F(t)$, X(t), $W_F$, and $W_{PA}$ to processing element 606 in accordance with the equations provided above for clock cycles 1-4. The multiplexer selection signals may be provided by FSM 608, which may utilize a finite state machine logic to cycle through the appropriate multiplexer selection signals.

As previously detailed above regarding FIGS. 1-4, the adaptation engine of processing circuitry 112 may be responsible for adaptively updating $W_{PA}$ and $W_F$ based on X(t) and z(t) in order to enhance the estimation accuracy of e(t) and thus improve the self-interference cancelation offered by processing circuitry 112. As shown in FIG. 6, matrix memory 116 may receive the kernel samples $X_t^{(1:K)}$ at each time t from kernel generation circuit 114 and may subsequently store each of the kernel outputs from the M previous samples, i.e. $X_{t:t-m+1}^{(1:K)}$, as X(t). As illustrated in the matrix storage scheme of FIG. 5, matrix memory 114 may store the entire K×M entries of X(t).

Matrix memory 116 may provide the current X(t) to PA update circuit 622 and FIR update circuit 628, which may be respectively responsible for calculating $X_{PA}(t)$ and $X_F(t)$ in 212a and 214a based on X(t) and $W_F$ and $W_{PA}$ provided by FIR filter memory 624 and PA filter memory 626. As shown in FIG. 6, PA update circuit 622 and FIR update circuit 628 may provide $X_{PA}(t)$ and $X_F(t)$ to PA kernel adaptation circuit 620 and FIR delay taps adaptation circuit 630, which may each respectively store the K and M samples of $X_{PA}(t)$ and $X_F(t)$.

PA kernel adaptation circuit 620 and FIR delay taps adaptation circuit 630 may then calculate $R_{PA}(t)$, $\beta_{PA}(t)$, $R_F(t)$, add $\beta_F(t)$ in 212b and 214b. However, as shown in the matrix storage scheme of FIG. 5, PA kernel adaptation circuit 620 and FIR delay taps adaptation circuit 630 may avoid calculating and storing the entire K×K and M×M matrices for $R_F(t)$ and $R_{PA}(t)$ and may instead store only the upper row of $R_F(t)$ and the upper triangle of $R_{PA}(t)$, thus conserving considerable storage and reducing the computational demands.

More specifically, as $R_{PA}(t)$ is the correlation between each of the kernels of $X_{PA}(t)$ with one another, $R_{PA}(t)$ will be a Hermitian matrix, where the lower triangle of off-diagonal elements is equal to the complex conjugate of the upper triangle of off-diagonal elements. Accordingly, instead of calculating the entire M×M matrix for $R_{PA}(t)$, PA kernel adaptation circuit 620 may instead in 212b calculate the upper triangle of $R_{PA}(t)$ (including the diagonal elements) and consequently only store the upper triangle elements of $R_{PA}(t)$. For any subsequent calculations involving lower triangle elements of $R_{PA}(t)$, PA kernel adaptation circuit 620 may take the complex conjugate of the corresponding upper-triangle element in order to obtain the lower triangle element.

Regarding $R_F(t)$, as noted above $R_F(t)$ may be the correlation between each of the taps of $X_F(t)$ with one another. While $R_F(t)$ may also be Hermitian, each row of $R_F(t)$ may share considerable statistical similarities given the relationship between each tap and the fact that the kernel dimension is fixed during update of $W_F$. In other words, the first row of $R_F(t)$, which gives the correlations between the first tap of $X_F(t)$ and each of the remaining M−1 taps of $X_F(t)$, may be increasingly similar to the other rows of $R_F(t)$, which may likewise give the correlations between a given tap of $X_F(t)$ and the other taps of $X_F(t)$. As each of the taps are proximate in time, it follows that each row may be approximately similar to the other rows; accordingly, without loss of generality, as opposed to calculating the entire M×M matrix or even the upper triangle of $R_F(t)$ FIR delay taps adaptation circuit 630 may instead calculate and store only a single row of $R_F(t)$, e.g. the first row of $R_F(t)$. FIR delay taps adaptation circuit 630 may then utilize the single row of $R_F(t)$ as an approximation when using $R_{F(n,n)}$ and $R_F(t-1)^{(n)}$. While this may act as an approximation, FIR delay taps adaptation circuit 630 may reduce storage and computational requirements through only storing a single row of $R_F(t)$.

Accordingly, in 212d and 214d when $R_{PA}(t)$ and $R_F(t)$ are needed in determining update factor α, PA kernel adaptation circuit 620 may simply retrieve $R_{PA(n,n)}$ (which is a diagonal element and thus will be explicitly stored as part of the upper triangle) while FIR delay taps adaptation circuit 630 may retrieve $R_{F(1,1)}$ regardless of n. As the actual value of $R_{F(n,n)}$ gives the correlation between the n-th tap and itself, $R_{F(1,1)}$ may serve as a suitable approximation as the correlation of the n=1 tap with itself. As can be seen from the matrix storage scheme illustrated in FIG. 5, this implementation may lead to considerable reductions in both storage and computational demands on the adaptation engine.

As shown in FIG. 6, PA kernel adaptation circuit 620 and FIR delay taps adaptation circuit 630 may each provide index n and weight $w_{PA,n}/w_{F,n}$ to controller/FSM 618, which may proceed to instruct filter memory 610 to update the corresponding n-th element of $W_{PA}/W_F$ with the specified weight $w_{PA,n}/w_{F,n}$. As such may involve a DCD update scheme of only a single bit, controller/FSM 618 may simply identify the weight index n and bit index m that needs to be flipped, thus prompting filter memory 610 to flip the m-th bit of the n-th weight of $W_{PA}/W_F$. Controller/FSM 618 may additionally include switching circuit 128 and thus may be responsible for selecting which of PA filter adaptation circuit 124 or FIR filter adaptation circuit 126 to activate.

Figure 7A:
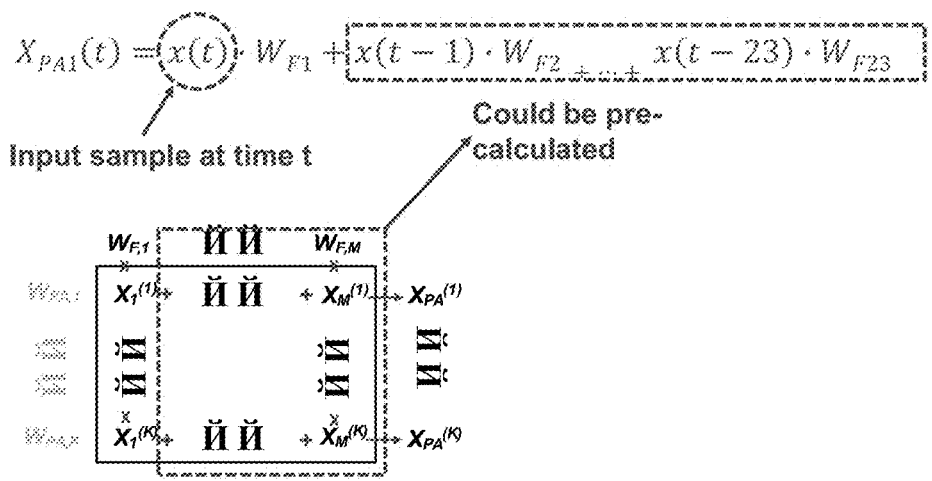
FIG. 7A-7B show a decoupled kernel dimension input signal calculation and decoupled delay tap dimension input signal calculation.

In addition to the matrix storage scheme, the adaptation engine of processing circuitry 112 may additionally reduce the computational requirements involved in calculating $X_{PA}(t)$ and $X_F(t)$ at PA update circuit 622 and FIR update circuit 628. FIG. 7A shows an illustration of the matrix multiplication $X_{PA}(t)=X(t)W_F$, where each k-th element of $X_{PA}(t)$ for k=1, K may be the dot product of $W_F$ with the k-th row of $X(t)$. As denoted in FIG. 7A, the k-th element $X_{PA,k}(t)$ of $X_{PA}(t)$ may then be given as $$X_{PA,k}(t) = X_t^{(k)} w_{F,1} + X_{t-1}^{(k)} w_{F,2} + \ldots + X_{t-M+1}^{(k)} w_{F,M-1} \quad (17)$$

where $w_{F,m}$ gives the m-th tap of $W_F$.

Accordingly, only the first sum term $X_t^{(k)} w_{F,1}$ will depend on the current input sample at time t while all of the remaining sum terms $X_{t-1}^{(k)} w_{F,2}, X_{t-2}^{(k)} w_{F,3}, \ldots X_{t-M+1}^{(k)} w_{F,M-1}$ depend on past samples from times t−1 and previous. Accordingly, as opposed to requiring the calculation of KM total sum terms required to calculate all of the K elements of $X_{PA}(t)$ after receiving the most recent $X_t^{(1:K)}$, PA update circuit 622 may pre-calculate and sum the past sum terms $X_{t-1}^{(k)} w_{F,2}, X_{t-2}^{(k)} w_{F,3}, \ldots X_{t-M+1}^{(k)} w_{F,M-1}$ for k=1, …, K at an earlier time and, after calculating $w_{F,1} X_t^{(1:K)}$, simply add the preprocessing sum terms to $w_{F,1} X_t^{(1:K)}$ to obtain the full $X_{PA}(t)$. PA update circuit 622 may therefore only need to have sufficient hardware to calculate K sum terms for $X_t^{(1:K)} w_{F,1}$, and thus may re-use this hardware to calculate the other sum terms at an earlier time (which may additionally require memory for K extra terms as shown for $X_{PA\_pre}(t)$ in FIG. 5). While the required computations may be the same, this may substantially reduce the hardware area requirements of PA update circuit 622, thus directly reducing manufacturing costs.

Figure 7B:
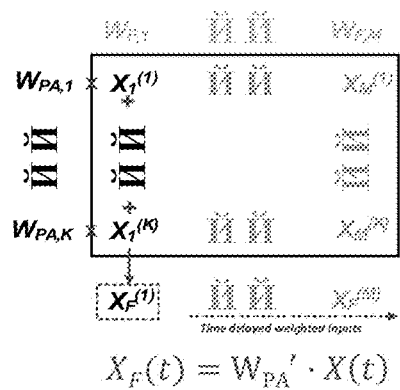

FIR update circuit 628 may also drastically simplify the calculation of $X_F(t)$ in 214a. As shown in FIG. 7B, since $W_{PA}$ is fixed during update of $W_F$, each of the M elements of $X_F(t)$ may be time-delayed weighted inputs of one another. Accordingly, FIR update circuit 628 may not need to calculate all M samples of $X_F(t)$ for each time t; instead, FIR update circuit 628 may utilize a first-in-first-out buffer approach (similar to as detailed above regarding buffer 602) and calculate $X_{F,t}(t)$, i.e. the sample of $X_F(t)$ for time t, to be stored with the previous M−1 samples of $X_F(t)$. The oldest sample of $X_F(t)$, i.e. from time t−M, may then be discarded every time a new sample $X_F(t)$ is calculated. As such may reduce the required computations from MK multiplications and M(K−1) additions to K multiplications and K−1 additions, FIR update circuit 628 may save considerably reduce complexity and the required hardware area.

Accordingly, PA update circuit 622 may employ pre-processing in order to reduce the hardware requirements for calculating $X_{PA}(t)$ while FIR update circuit 628 may utilize the time-delayed weighted relationship to reduce the computational requirements for calculating $X_F(t)$. As noted above, these modifications are optional and may or may not be implemented in various aspects of this disclosure.

Due to the complexity involved in self-interference estimation, a key constraint in many self-interference cancelation designs is hardware area. As noted above, the preprocessing modification of PA update circuit 622 may reduce the number of multiplication and addition hardware elements needed as PA update circuit 622 may only need to perform K multiplications with the current kernel samples $X_t^{(1:K)}$ followed by K additions with each of the K preprocessing sum terms to obtain $X_{PA}(t)$. PA update circuit 622 may then perform the K(M−1) complex multiplications and K(M−2) complex additions by re-using the same hardware during other clock cycles. The adaptation engine of processing circuitry 112 may utilize further hardware computation schedules in order to re-use hardware and thus reduce the hardware requirements of processing circuitry 112. As noted above, such hardware scheduling is optional and thus may or may not be utilized in various aspects of this disclosure.

Figure 8:
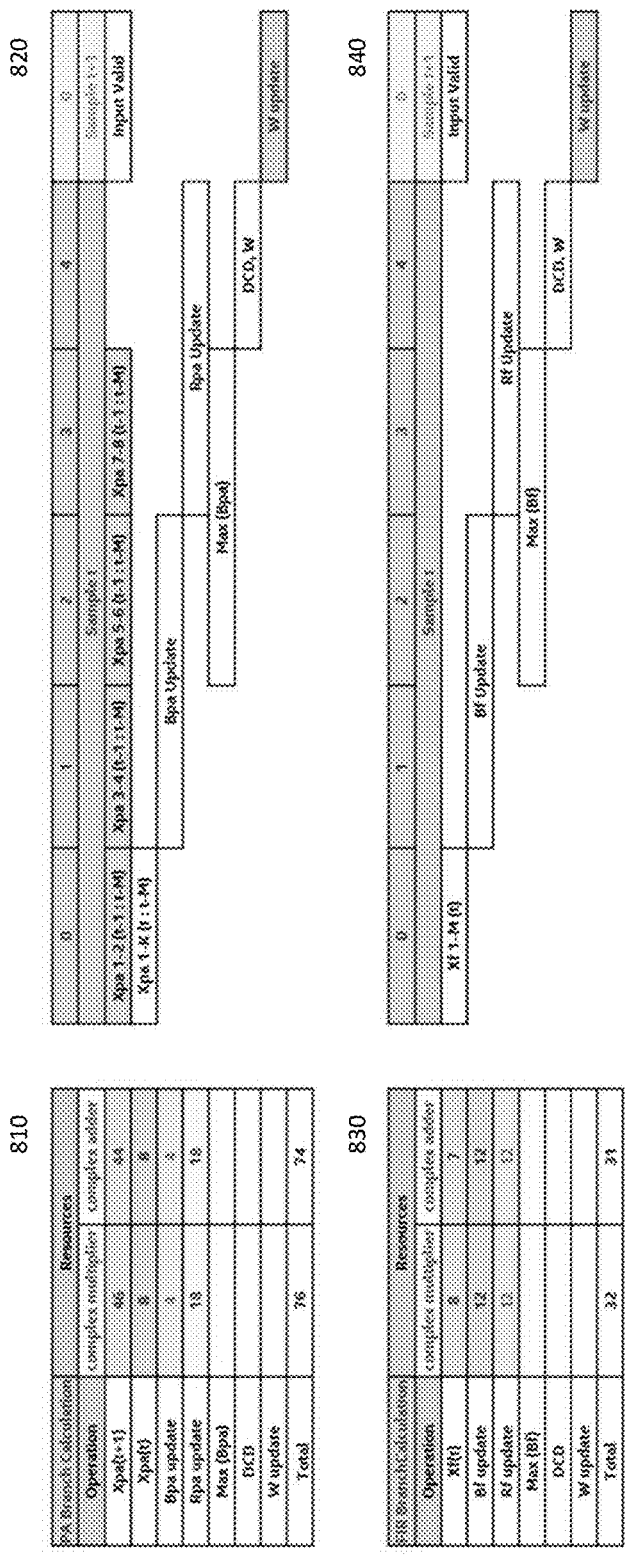
FIG. 8 shows a resource table and hardware pipeline clock schedule.

FIG. 8 depicts an exemplary hardware computation schedule for PA adaptation circuit 124 (PA update circuit 622, PA kernel adaptation circuit 620, and controller/FSM 618) and FIR adaptation circuit 126 (FIR update circuit 628, FIR delay taps adaptation circuit 630, and controller/FSM 618). Tables 810 and 830 show the total numbers of multipliers and adders (as will be further detailed) that the adaptation engine may utilize for each operation while hardware schedules 820 and 840 depict the computational operations executed by PA adaptation circuit 124 and FIR adaptation circuit 126 during each clock cycle. As shown in hardware schedules 820 and 840, both PA adaptation circuit 124 and FIR adaptation circuit 126 may utilize 5 clock cycles in order to complete a single update of $W_{PA}$ and $W_F$ for a given sample t.

As shown in PA branch schedule 820, PA update circuit 622 may calculate the preprocessing sum terms $X_{t-1}^{(k)} w_{F,2}$, $X_{t-2}^{(k)} w_{F,3}$, ... $X_{t-M+1}^{(k)} w_{F,M-1}$ for k=1, ..., K of $X_{PA}(t)$ as noted above regarding Equation (17) in 'hidden' clock cycles (denoted as shaded cycles in hardware schedule 820), which may be distributed at any time prior to the start of calculations for sample time t. As denoted in the exemplary context of FIG. 8, M and K may be set to M=24 and K=8; accordingly, PA update circuit 622 may reuse the same computation hardware over multiple clock cycles. As shown in hardware schedule 820, PA update circuit 622 may utilize e.g. 2(M−1) complex multipliers and 2(M−2) complex adders in order to support calculation of the preprocessing sum terms $X_{t-1}^{(k)} w_{F,2}$, $X_{t-2}^{(k)} w_{F,3}$, ... $X_{t-M+1}^{(k)} w_{F,M-1}$ for two k indices at a time; e.g. for k=1, 2 in clock cycle 0, k=3, 4 in clock cycle 1, k=5, 6 in clock cycle 2, and k=7, 8 in clock cycle 3. The amount of computation hardware may be adjusted to various different with varying tradeoffs between the number of clock cycles and hardware area.

PA update circuit 622 may then apply a subset of the same complex multipliers and adders to calculate the sum terms for the kernels of time t, $X_t^{(1:K)}$, as $w_{F,1} X_t^{(1:K)}$, during clock cycle 0 and add the sum terms to the preprocessing sum terms to obtain $X_{PA}(t)$ (212a). As each element $X_{PA}(t)$ is needed to calculate $\beta_{PA}(t)$, PA kernel adaptation circuit 620 may begin the update of $\beta_{PA}(t)$ (212b) in clock cycle 1. In order to reduce the hardware requirements, PA kernel adaptation circuit 620 may update $\beta_{PA}(t)$ over both clock cycles 1 and 2, thus only requiring 4 complex multipliers and 4 complex adders as denoted in table 810 while still avoiding any data dependencies. PA kernel adaptation circuit 620 may also begin identifying $\beta_{PA,max}$ and n (212c) in clock cycle 2 with the elements of $\beta_{PA}(t)$ calculated in clock cycle 1 and completing the identification of $\beta_{PA,max}$ and n in clock cycle 3 with the remaining elements of $\beta_{PA}(t)$ calculated in clock cycle 2. PA kernel adaptation circuit 620 may simultaneously begin updating $R_{PA}(t)$ (212b) in clock cycle 3, which may be completed in clock cycle 4 (212e). As previously indicated, PA kernel adaptation circuit 620 may update the diagonal elements of $R_{PA}(t)$ in the clock cycle 3 and the non-diagonal elements of $R_{PA}(t)$ in clock cycle 4 in order to avoid data dependency issues related to the use of $R_{PA(n,n)}$ in identifying $\beta_{PA,max}$.

While completing update of $R_{PA}(t)$ in clock cycle 4, PA kernel adaptation circuit 620 may concurrently perform the DCD update scheme in order to identify α, i.e. the bit of $w_{PA,n}$ that will be flipped. PA kernel adaptation circuit 620 may provide n and α to controller/FSM 618, which may complete the update of $W_{PA}$ by updating $w_{PA,n}$ according to α during the next clock cycle, which PA update circuit 622 may concurrently utilize as clock cycle 0 to calculate $w_{F,1} X_{t+1}^{(1:K)}$ for the next time t+1.

FIR adaptation circuit 126 may similarly utilize a specific 5-clock cycle as shown in hardware schedule 840. As FIR update circuit 628 may only need to perform M multiplications and M−1 additions to calculate $X_F(t)$ (due to the time-delayed weighted relationship noted above), FIR adaptation circuit 126 may not need to perform any preprocessing stages in hidden clock cycles. Accordingly, FIR update circuit 628 may apply M complex multipliers and M−1 complex adders in clock cycle 0 to calculate $X_F(t)$ (214a). FIR delay taps adaptation circuit 630 may similarly use a staggered clock cycle scheme in clock cycles 1-4 in order to update $\beta_F(t)$, $R_F(t)$, and identify n and (214b and 214c). FIR delay taps adaptation circuit 630 may then apply the DCD scheme to determine α (214d) in clock cycle 4 and provide n and a to controller/FSM 618 for update of $w_{F,n}$ in the following clock cycle 0 of the next update. FIR delay taps adaptation circuit 630 may likewise calculate the diagonal elements of $R_F(t)$ in clock cycle 3 and the non-diagonal elements of $R_F(t)$ in clock cycle 4 in order to avoid data dependency issues.

The schedules and hardware resource tables depicted in FIG. 8 may thus provide an efficient implementation that offers an advantageous tradeoff between latency and hardware area. Numerous other schedules and hardware architectures are also within the scope of this disclosure.

The individual components of processing circuitry 112 detailed above may be structurally realized/embodied as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Accordingly, while the individual components of processing circuitry 112 are depicted separately in FIG. 1 and FIG. 6, this depiction merely serves to highlight the operation of processing circuitry 112 on a functional level; consequently, one or more of the components of processing circuitry 112 may be integrated into a common hardware and/or software element.

Figure 9:
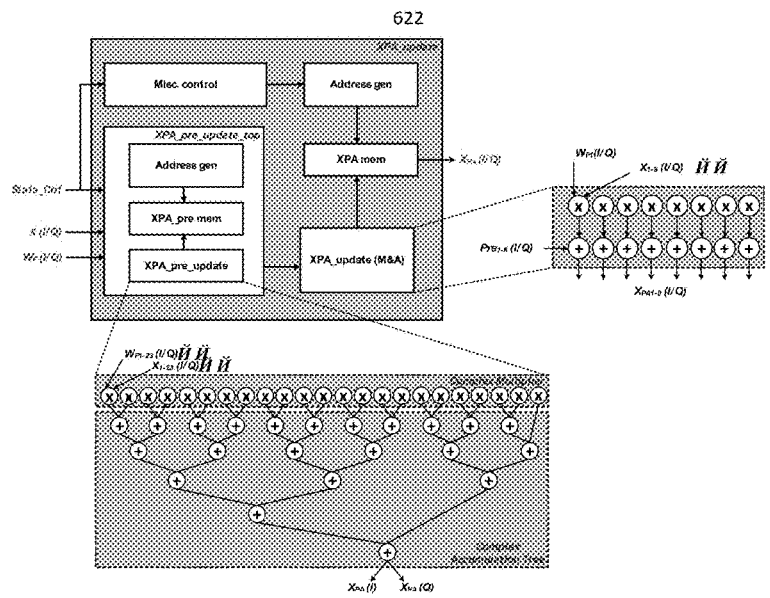
FIG. 9 shows a diagram of a decoupled kernel dimension input signal calculation circuit.
Figure 10:
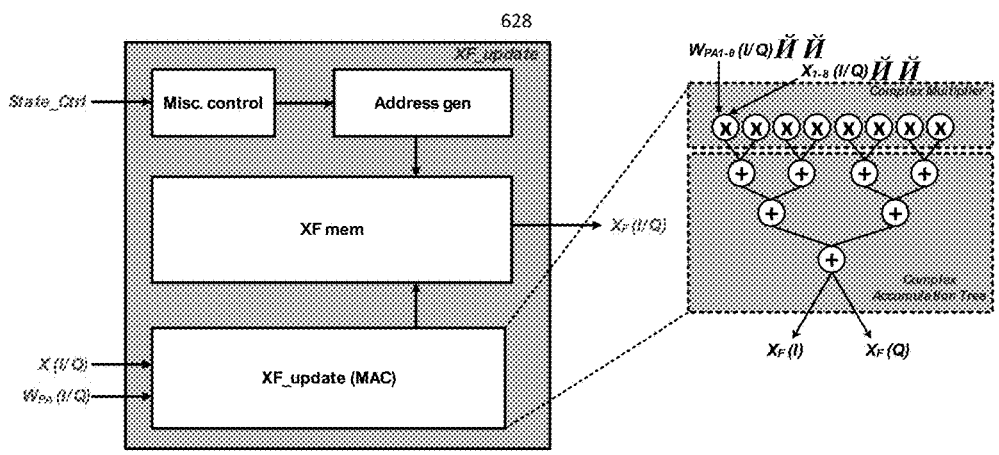
FIG. 10 shows a diagram of a decoupled delay tap dimension input signal calculation circuit.
Figure 11:
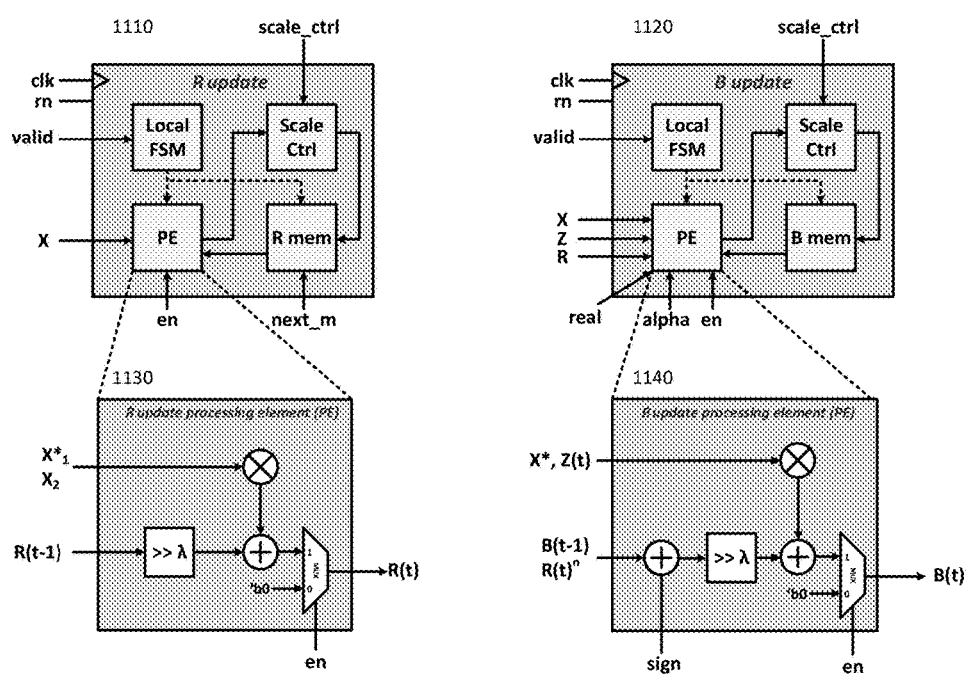
FIG. 11 shows diagrams of a correlation and cross-correlation update circuit.

Without loss of generality, FIGS. 9-11 illustrate exemplary internal configurations of PA update circuit 622, FIR update circuit 628, PA kernel adaptation circuit 622, and FIR delay taps adaptation circuit 630.

FIG. 9 shows the internal computational and memory elements of PA update circuit 622. Corresponding to table 810, PA update circuit 622 may include 2(M−1) complex mulitpliers and 2(M−2) complex adders for the preprocessing $X_{PA}(t)$ calculations and K complex multipliers and complex adders for the current $X_{PA}(t)$ calculation. PA update circuit 622 may additionally include the K element memories for $X_{PA\_pre}(t)$ and $X_{PA}(t)$ as shown in FIG. 9. FIR update circuit 628 shown in FIG. 10 may include the M element $X_F(t)$ memory and K complex multipliers and K−1 complex adders for $X_F(t)$.

FIG. 11 shows correlation update circuit 1110 and cross-correlation update circuit 1120. As the correlation and cross-correlations of PA update iteration 212 and FIR update iteration 214 may be identical, both PA kernel adaptation circuit 620 and FIR delay taps adaptation circuit 830 may include multiple correlation update circuits 1110 and cross-correlation update circuits 1120 in order to perform the calculations needed to obtain $R_{PA}(t)$, $\beta_{PA}(t)$, $R_F(t)$, and $\beta_F(t)$. The number of correlation update circuits 1110 and cross-correlation update circuits 1120 included in both PA kernel adaptation circuit 620 and FIR Depay taps adaptation circuit 630 may depend on the M, K, and various factors related to clock cycle/pipeline schedules and hardware area. As shown in FIG. 11, both correlation update circuit 1110 and cross-correlation update circuit 1120 may include a local FSM to direct the clock cycle scheduling, e.g. in accordance with a hardware schedule such as shown in FIG. 8), a set of processing elements (PE) composed of either correlation PEs 1130 or cross-correlation PEs 1140, a matrix memory for holding R(t)/β(t), and a scale control circuit. The capacity and contents of the matrix memories may correspond to whether correlation update circuit 1110 and cross-correlation update circuit 1120 is assigned to PA kernel adaptation circuit 620 or FIR delay taps adaptation circuit 830.

The number of PEs included in each of correlation update circuit 1110 and cross-correlation update circuit 1120 may be dictated by the number of matrix elements that need to be calculated in parallel. As each correlation PE 1130 and cross-correlation PE 1140 may be configured to update a single element of R(t)/β(t), PA kernel adaptation circuit 620 and FIR delay taps adaptation circuit 630 may each include multiple correlation update circuits 1110 and multiple cross-correlation update circuits 1120 in order to support calculation of multipole updates to R(t)/β(t) in parallel. Such may consequently depend on the desired clock cycle scheduling, such as shown in FIG. 8. As detailed in table 810, PA kernel adaptation circuit 620 may include e.g. 18 correlation update circuits 1110 and e.g. 4 cross-correlation update circuits 1120 for K=8 and M=24 in order to enable a 5 clock cycle update iteration. Such may allow PA kernel adaptation circuit 620 to calculate the 36 total required complex multiplications and additions to update $R_{PA}(t)$ spread over two clock cycles (18 complex multiplications and additions per clock cycle) and to calculate the 8 total required complex multiplications and additions to update $β_{PA}(t)$ spread over two clock cycles (4 per complex multiplications and additions per clock cycle).

As noted in table 830, FIR delay taps adaptation circuit 630 may need to include e.g. 12 correlation update circuits 1110 and e.g. 12 cross-correlation update circuits 1120. Such may thus allow FIR delay taps adaptation circuit 630 to calculate the 24 total required complex multiplications and additions to update $R_F(t)$ spread over two clock cycles (12 complex multiplications and additions per clock cycle) and to calculate the 12 total required complex multiplications and additions to update $β_{FIR}(t)$ spread over two clock cycles (12 per complex multiplications and additions per clock cycle).

Due to the equivalence in the calculations for PA and FIR updates and the decoupled operation mode, PA kernel adaptation circuit 620 and FIR delay taps adaptation circuit 630 may in certain aspects of this disclosure be configured to share the same correlation update circuit 1110 and cross-correlation update circuit 1120, i.e. to re-use the same hardware at different times depending on which of PA kernel adaptation circuit 620 and FIR delay taps adaptation circuit 630 is currently updating $W_{PA}$ or $W_F$, respectively. As PA kernel adaptation circuit 124 and FIR adaptation circuit 126 operate separately, such may only require that the shared correlation update circuit 1110 and shared cross-correlation update circuit 1120 include the proper number of correlation PEs 1130 and cross-correlation PEs 1140 to support both PA and FIR updates, e.g. 18 correlations PEs 1130 and 12 cross-correlation PEs 1140.

Figure 12:
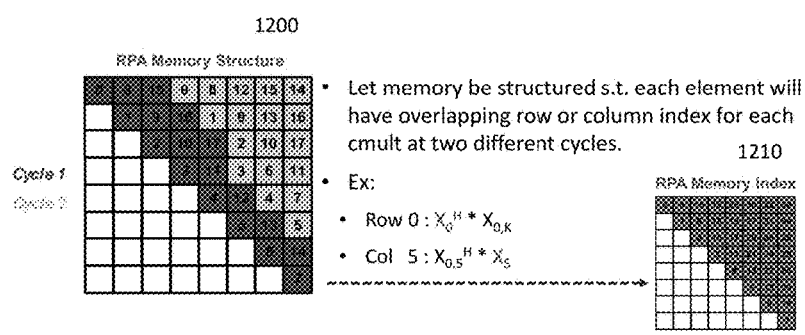
FIG. 12 shows a matrix memory indexing scheme.

As shown in FIG. 11, each correlation PE 1130 may receive two samples of $X_{PA}(t)/X_F(t)$ to multiply. In order to simplify the input data switching overhead, correlation update circuit 1110 may utilize a smart memory indexing and cycle allocation scheme. FIG. 12 illustrates the smart memory indexing and cycle allocation scheme for an exemplary implementation where correlation update circuit 1110 includes 18 correlation PEs 1130 and utilizes two cycles to calculate $R_{PA}(t)$ for K=8 and M=24. As denoted by the shading of table 1200, correlation update circuit 1100 may optimize the calculation of each element of $R_{PA}(t)$ by ensuring that each correlation PE 1130 calculates an element of $R_{PA}(t)$ in the first cycle that is in the same column or row as the element of $R_{PA}(t)$ calculated in the second cycle. As either the column or row remains the same, one input of each correlation PE 1130 may remain the same for both the first and second cycles (as this input will be same element of $X_{PA}(t)$). Such is shown by the numerical indices of table 1200, which indicate which of the 18 total correlation PEs 1130 will calculate the corresponding element of $R_{PA}(t)$. Additionally, correlation update circuit 1110 may calculate the diagonal elements of $R_{PA}(t)$ in the first cycle, thus eliminating the data dependency that can occur in the pipeline schedule shown in FIG. 8. Correlation update circuit 1110 may thus utilize the memory index shown in table 1210 to index the memory for $R_{PA}(t)$.

The optional enable signal en at each of correlation PEs 1130 and cross-correlation PEs 1140 may allow for configurable operation, e.g. for processing circuitry 112 to be utilized for any K'≤K kernels and M'<M taps. Accordingly, the enable signal en may be utilized to disable all unused correlation PEs 1130 and cross-correlation PEs 1140, e.g. K−K' or M−M' unused correlation PEs 1130 and cross-correlation PEs 1140.

While optional, the scale control circuits may be included in order to maintain the stability between $W_{PA}$ and $W_F$. As both dimensions are decoupled in processing circuitry 112, it may be possible for the weights to become biased towards either PA or FIR, i.e. where one of $W_{PA}$ and $W_F$ becomes much stronger than the other. Accordingly, the scale control circuitry may be configured to detect if the weights become biased towards one of $W_{PA}$ and $W_F$ and, if so, apply a scale factor in order to counter the bias.

Figure 13:
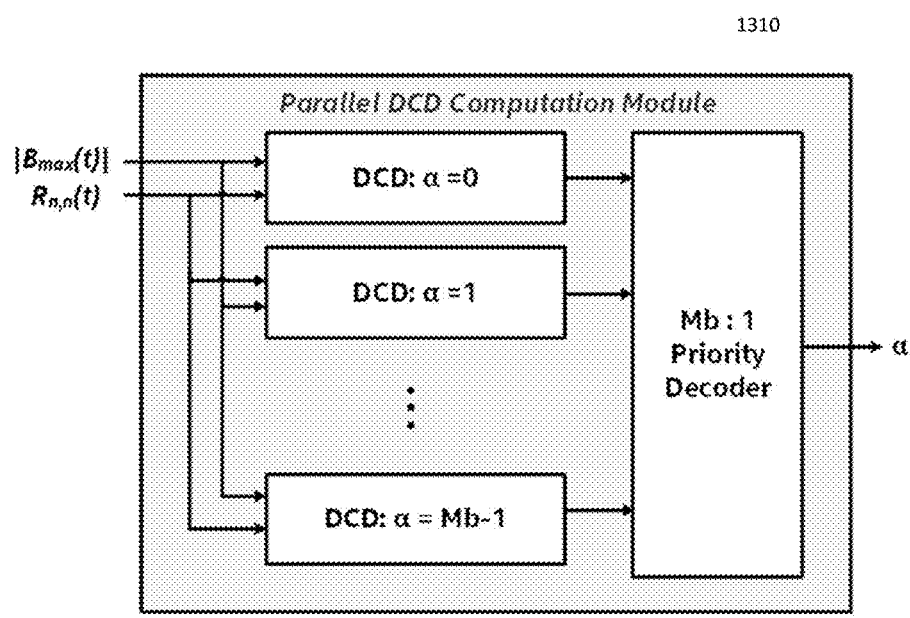
FIG. 13 shows a diagram of a DCD circuit.

Each of PA kernel adaptation circuit 620 and FIR delay taps adaptation circuit 830 may additionally include DCD circuit 1310 as shown in FIG. 13, which may be configured to execute the DCD update process to identify α (212d/214d). As for the other modifications introduced above, this internal configuration of DCD circuit 1310 is exemplary and other realizations are within the scope of this disclosure. While mathematically expressed as a for loop in 212d and 214d, DCD circuit 1310 may be implemented with a parallel architecture, where DCD circuit 1310 may evaluate each value of $a=2^0, 2^1, \ldots, 2^{M_b-1}$ in parallel with e.g. one comparator per hypothesis to evaluate the comparison $$|β_{max}| > \frac{α}{2} R_{(n,n)}$$

of 212d/214d. As only one comparator may be needed, this may offer a significant tradeoff between hardware and throughput, thus considerably favoring a parallel architecture. DCD circuit 1310 may also be configurable to support up to $M_b$ bits as the individual a comparators may be left unused.

Figure 14:
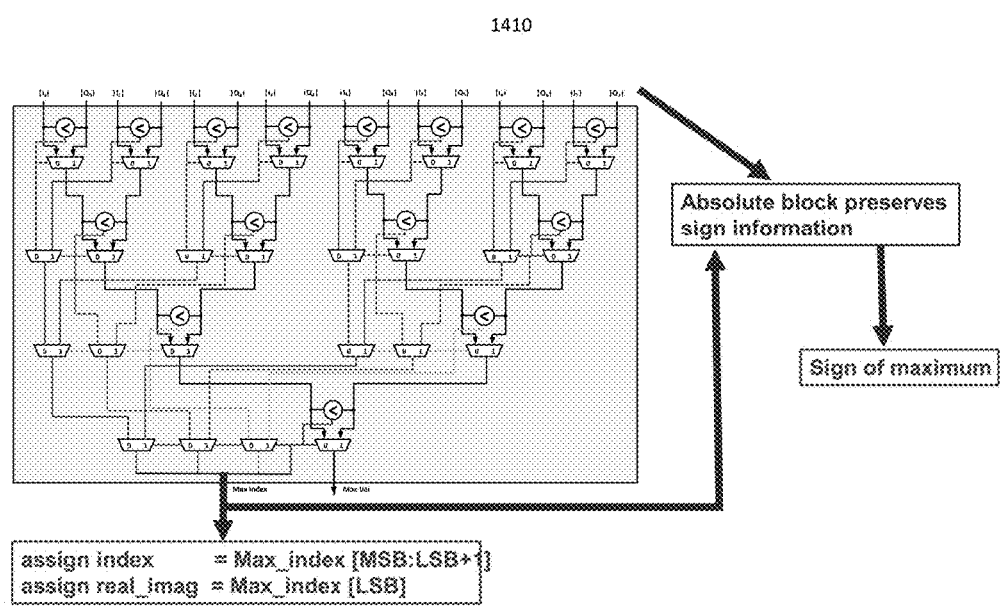
FIG. 14 shows a diagram of a maximum cross-correlation identification circuit.

PA kernel adaptation circuit 620 and FIR delay taps adaptation circuit 830 may additionally include maximum cross-correlation detection circuit 1410 shown in FIG. 14, which may be configured to identify $β_{max}$ for $β_{FA}(t)$ and $β_F(t)$ in 212c/214c by identifying the element of $β_{FA}(t)/β_F(t)$ with the largest real or imaginary part using the comparator and multiplexer logic shown in FIG. 14. Maximum cross-correlation detection circuit 1410 may additionally preserve the sign of $\beta_{max}$ in order to update $w_n$ in the proper direction. Generally speaking, PA kernel adaptation circuit 620 and FIR delay taps adaptation circuit 830 may each thus be composed of correlation update circuit 1110, cross-correlation update circuit 1120, DCD circuit 1310, and maximum cross-correlation detection circuit 1410.

Accordingly, any of the various modifications noted above may be implemented as part of processing circuitry 112, which may offer a variety of advantages including reduced computational demands and latency, reduced hardware area, reduced memory requirements, etc. Processing circuitry 112 may thus provide a highly effective self-interference cancelation system that may be realizable with current technology. Although M and K may be scaled to any values, M=24 and K=8 may present an attractive balance between estimation accuracy and complexity. When combined with various of the optional modifications noted above, such may provide a system that has as much as an 80% hardware reduction compared to the existing 'non-decoupled' solution (i.e. with updates of W of dimension K×M). As noted above, processing circuitry 112 may additionally be implemented as a 'configurable' design where processing circuitry 112 may be realized to support up to M taps and K kernels but can be dynamically configured to perform self-interference cancelation with any M'≤M taps and K'≤K kernels.

Figure 15:
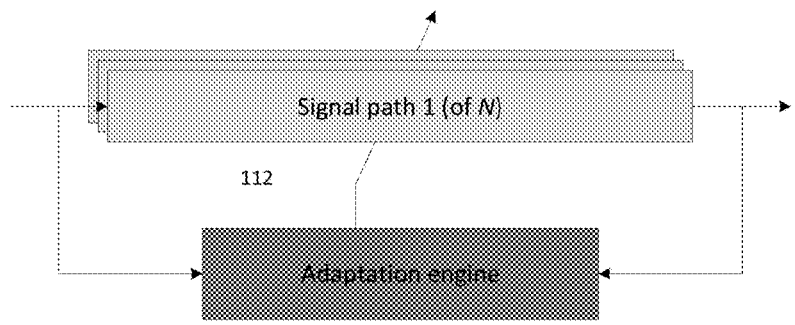
FIG. 15 shows a diagram of a multi-signal path solution.

Furthermore, the implementations of processing circuitry 112 shown in FIGS. 1 and 4 include only a single signal path. However, as shown in FIG. 15, processing circuitry 112 may be expanded to include N signal paths, which may collectively be served by a single adaptation engine. For example, each of the N signal paths may correspond to a different MIMO layer, where the self-interference on each MIMO layer may need to be addressed separately to reflect the different radio channels associated with each MIMO layer. Accordingly, each of the N paths may demand a unique $W_F$ and $W_{PA}$ in addition to a separate X(t) to reflect the differing transmit symbols for each path.

While such an architecture could be supported with N adaptation engines each assigned to a respective signal path, processing circuitry 112 as shown in FIG. 15 may instead alternate between updating the individual $W_F$ and $W_{PA}$ for each signal path. For example, the adaptation engine may adaptively update $W_F$ and $W_{PA}$ (also updated in a decoupled switching fashion) for signal path 1 for a predefined cycle of samples or until a convergence criteria is reached (e.g. based on $\beta_F(t)$ and/or $\beta_{PA}(t)$) before switching to updating $W_F$ and $W_{PA}$ for signal path 2 for a predefined cycle of samples or until a convergence criteria is reached, and so forth. As complete convergence may occur after several hundred samples, such may allow a single adaptation engine to handle filter updating for multiple signal paths, thus considerably reducing hardware area.

Figure 16:
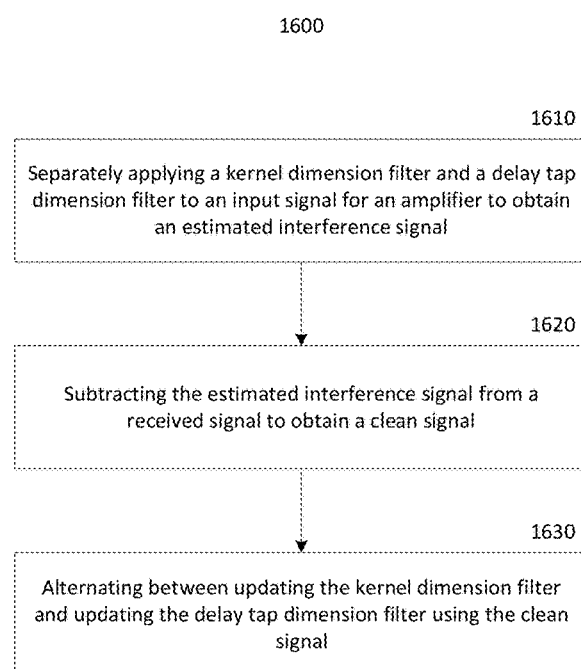
FIG. 16 shows a first method of performing interference cancelation.

FIG. 16 shows method 1600 of method of performing interference cancelation. As shown in FIG. 16, method 1600 includes separately applying a kernel dimension filter and a delay tap dimension filter to an input signal for an amplifier to obtain an estimated interference signal (1610), subtracting the estimated interference signal from a received signal to obtain a clean signal (1620), and alternating between updating the kernel dimension filter and updating the delay tap dimension filter using the clean signal (1630).

Figure 17:
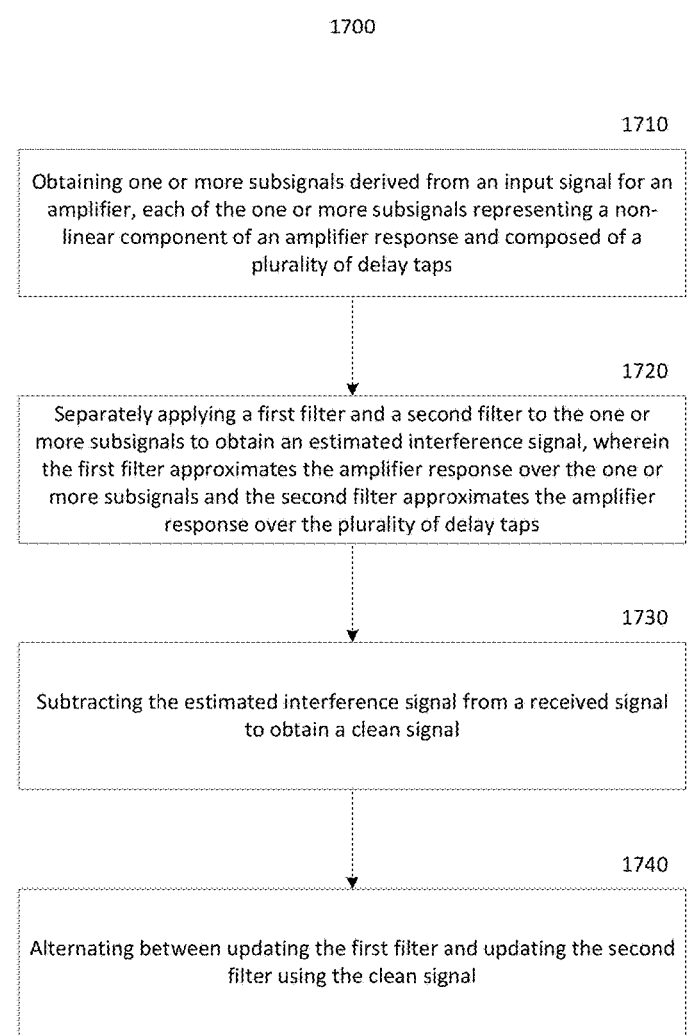
FIG. 17 shows a second method of performing interference cancelation.

FIG. 17 shows method 1700 of performing interference cancelation. As shown in FIG. 17, method 1700 includes obtaining one or more subsignals derived from an input signal for an amplifier (1710), each of the one or more subsignals representing a non-linear component of an amplifier response and composed of a plurality of delay taps, separately applying a first filter and a second filter to the one or more subsignals to obtain an estimated interference signal (1720), wherein the first filter approximates the amplifier response over the one or more subsignals and the second filter approximates the amplifier response over the plurality of delay taps (1730), subtracting the estimated interference signal from a received signal to obtain a clean signal, and alternating between updating the first filter and updating the second filter using the clean signal (1740).

In one or more further exemplary aspects of the disclosure, one or more of the features described above in reference to FIGS. 1-15 may be further incorporated into method 1600 and/or 1700. In particular, method 1600 and/or 1700 may be configured to perform further and/or alternate processes as detailed regarding processing circuitry 112 and/or communication circuitry 100.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further aspects of this disclosure:

Example 1 is a method of performing interference cancelation including separately applying a kernel dimension filter and a delay tap dimension filter to an input signal for an amplifier to obtain an estimated interference signal, subtracting the estimated interference signal from a received signal to obtain a clean signal, and alternating between updating the kernel dimension filter and updating the delay tap dimension filter using the clean signal.

In Example 2, the subject matter of Example 1 can optionally include wherein separately applying the kernel dimension filter and the delay tap dimension filter to the input signal for the amplifier to obtain the estimated interference signal includes processing the input signal to derive a plurality of kernel signals from the input signal, wherein each of the plurality of kernel signals approximates a non-linear component of a response of the amplifier, and separately applying the kernel dimension filter and the delay tap dimension filter to the plurality of kernel signals to obtain the estimated interference signal.

In Example 3, the subject matter of Example 2 can optionally include wherein each of the plurality of kernel signals is composed of a plurality of delay taps, wherein each weight of the kernel dimension filter corresponds to a respective one of the plurality of kernel signals and each weight of the delay tap dimension filter corresponds to a respective one of the plurality of delay taps.

In Example 4, the subject matter of Example 3 can optionally include wherein the number of plurality of kernel signals is configurable or the number of plurality of delay taps is configurable.

In Example 5, the subject matter of Example 3 can optionally include wherein the kernel dimension filter approximates the response of the amplifier over the plurality of kernel signals and the delay tap dimension filter approximates the response of the amplifier over the plurality of delay taps.

In Example 6, the subject matter of any one of Examples 1 to 5 can optionally include wherein the kernel dimension filter and the delay tap dimension filter are vectors.

In Example 7, the subject matter of any one of Examples 1 to 5 can optionally further include amplifying the input signal with the amplifier and transmitting the amplified input signal with a radio antenna.

In Example 8, the subject matter of Example 5 can optionally further include receiving the received signal with the radio antenna, wherein the estimated interference signal approximates leakage from the amplified input signal that is contained in the received signal.

In Example 9, the subject matter of any one of Examples 1 to 8 can optionally include wherein alternating between updating the kernel dimension filter and updating the delay tap dimension filter using the clean signal includes updating the kernel dimension filter and the delay tap dimension filter based on the plurality of kernel signals and the clean signal.

In Example 10, the subject matter of any one of Examples 2 to 8 can optionally include wherein alternating between updating the kernel dimension filter and updating the delay tap dimension filter using the clean signal includes selecting between the kernel dimension filter and the delay tap dimension filter to identify a current filter to update and a fixed filter to hold constant, applying the fixed filter to the plurality of kernel signals to obtain a decoupled input signal, and comparing the decoupled input signal to the clean signal to identify at least one weight of the current filter to update.

In Example 11, the subject matter of Example 10 can optionally include wherein comparing the decoupled input signal to the clean signal to identify the at least one weight of the current filter to update includes determining a cross-correlation vector between the decoupled input signal and the clean signal, identifying a first weight of the current filter to update based on the cross-correlation vector, and exclusively updating the first weight of the current filter.

In Example 12, the subject matter of Example 11 can optionally include wherein identifying the first weight of the current filter to update based on the cross-correlation vector includes identifying a maximum-valued element of the cross-correlation vector, and identifying the weight of the current filter with a corresponding element index to the maximum-valued element of the cross-correlation vector as the first weight.

In Example 13, the subject matter of Example 12 can optionally include wherein identifying the maximum-valued element of the cross-correlation vector includes identifying the element of the cross-correlation vector with the largest real component or the largest imaginary component as the maximum-valued element.

In Example 14, the subject matter of Example 10 can optionally include wherein comparing the decoupled input signal to the clean signal to identify the at least one weight of the current filter to update includes determining a cross-correlation vector between the decoupled input signal and the clean signal, and updating the at least one weight of the current filter to reduce a magnitude of the cross-correlation vector.

In Example 15, the subject matter of Example 14 can optionally include wherein updating the at least one weight of the current filter to reduce the magnitude of the cross-correlation vector includes updating the at least one weight of the current filter to reduce the magnitude of the cross-correlation vector according to a coordinate descent optimization scheme.

In Example 16, the subject matter of Example 14 can optionally include wherein updating the at least one weight of the current filter to reduce the magnitude of the cross-correlation vector includes updating the at least one weight of the current filter to reduce the magnitude of the cross-correlation vector according to a recursive least squares optimization scheme.

In Example 17, the subject matter of Example 14 can optionally include wherein updating the at least one weight of the current filter to reduce the magnitude of the cross-correlation vector includes updating the at least one weight of the current filter to reduce the magnitude of the cross-correlation vector according to a recursive least squares (RLS) dichotomous coordinate descent (DCD) optimization scheme.

In Example 18, the subject matter of Example 14 can optionally include wherein updating the at least one weight of the current filter to reduce the magnitude of the cross-correlation vector includes exclusively inverting a single bit of the first weight to reduce the magnitude of the cross-correlation vector.

In Example 19, the subject matter of Example 18 can optionally include wherein updating the at least one weight of the current filter to reduce the magnitude of the cross-correlation vector further includes evaluating one or more candidate bit inversions of the first weight to identify which of the one or more candidate bit inversions is closest to a predefined numerical difference, and identifying the single bit according to which of the one or more candidate bit inversions is closest to the predefined numerical difference.

In Example 20, the subject matter of Example 18 can optionally include wherein exclusively inverting the single bit of the first weight to reduce the magnitude of the cross-correlation vector includes inverting the single bit of the first weight according to a dichotomous coordinate descent optimization scheme.

In Example 21, the subject matter of Example 10 can optionally include wherein selecting between the kernel dimension filter and the delay tap dimension filter to identify the current filter to update and the fixed filter to hold constant includes selecting the kernel dimension filter as the current filter and the delay tap dimension filter as the fixed filter, and wherein applying the fixed filter to the plurality of kernel signals to obtain the decoupled input signal includes applying previous delay taps of the delay tap dimension filter to previous delay taps of the plurality of kernel signals during a preprocessing stage that occurs before receiving a most recent delay tap of the plurality of kernel signals, and after receiving the most recent delay tap of the plurality of kernel signals, applying a most recent delay tap of the delay tap dimension filter to the most recent delay tap of the plurality of kernel signals.

In Example 22, the subject matter of Example 21 can optionally further include performing the preprocessing stage during hidden clock cycles that occur before the most recent delay tap of the plurality of kernel signals is obtained.

In Example 23, the subject matter of Example 10 can optionally include wherein selecting between the kernel dimension filter and the delay tap dimension filter to identify the current filter to update and the fixed filter to hold constant includes selecting the delay tap dimension filter as the current filter and the kernel dimension filter as the fixed filter, and wherein applying the fixed filter to the plurality of kernel signals to obtain the decoupled input signal includes exclusively applying the kernel dimension filter to samples of the plurality of kernel signals corresponding to a single delay tap to obtain a first element of the decoupled input signal.

In Example 24, the subject matter of Example 23 can optionally include wherein the remaining elements of the decoupled input signal are time-delayed weighted versions of the first element of the decoupled input signal.

In Example 25, the subject matter of any one of Examples 2 to 20 can optionally include wherein alternating between updating the kernel dimension filter and updating the delay tap dimension filter using the clean signal includes selecting between the kernel dimension filter and the delay tap dimension filter to identify a current filter to update and a fixed filter to hold constant, applying the fixed filter to the plurality of kernel signals to obtain a decoupled input signal, determining a cross-correlation vector between the decoupled input signal and the clean signal and determining a correlation matrix of the decoupled input signal, and updating at least one weight of the current filter based on the cross-correlation vector and the correlation matrix.

In Example 26, the subject matter of Example 25 can optionally include wherein determining the cross-correlation vector between the decoupled input signal and the clean signal includes determining some elements of the cross-correlation vector during a first clock cycle with first calculation circuitry and determining other elements of the cross-correlation vector during a second clock cycle with the same first calculation circuitry, or determining some elements of the correlation matrix during a third clock cycle with second calculation circuitry and determining other elements of the correlation matrix during a second clock cycle with the same second calculation circuitry.

In Example 27, the subject matter of Example 25 can optionally include wherein selecting between the kernel dimension filter and the delay tap dimension filter to identify the current filter to update and the fixed filter to hold constant includes selecting the kernel dimension filter as the current filter and the delay tap dimension filter as the fixed filter, and wherein determining the cross-correlation vector between the decoupled input signal and the clean signal and determining the correlation matrix of the decoupled input signal includes exclusively determining the upper-triangle elements of the correlation matrix.

In Example 28, the subject matter of Example 27 can optionally include wherein the correlation matrix is a Hermitian matrix.

In Example 29, the subject matter of Example 25 can optionally include wherein selecting between the kernel dimension filter and the delay tap dimension filter to identify the current filter to update and the fixed filter to hold constant includes selecting the delay tap dimension filter as the current filter and the kernel dimension filter as the fixed filter, and wherein determining the cross-correlation vector between the decoupled input signal and the clean signal and determining the correlation matrix of the decoupled input signal includes exclusively determining a single row of the correlation matrix.

In Example 30, the subject matter of Example 29 can optionally include wherein a plurality of rows including the single row of the correlation matrix are statistically similar.

In Example 31, the subject matter of any one of Examples 1 to 24 can optionally include wherein alternating between updating the kernel dimension filter and updating the delay tap dimension filter using the clean signal includes using shared circuitry to update the kernel dimension filter and re-using the same shared circuitry to update the delay tap dimension filter.

In Example 32, the subject matter of any one of Examples 1 to 24 can optionally include wherein alternating between updating the kernel dimension filter and updating the delay tap dimension filter using the clean signal includes using shared circuitry to update the kernel dimension filter and re-using the same shared circuitry to update the delay tap dimension filter according to a pipeline clock schedule.

In Example 33, the subject matter of Example 32 can optionally include wherein alternating between updating the kernel dimension filter and updating the delay tap dimension filter includes updating the kernel dimension filter at one or more first times and updating the delay tap dimension at one or more different second times.

Example 34 is a communication circuitry arrangement configured to perform the method of any one of Examples 1 to 33.

In Example 35, the subject matter of Example 34 can optionally be configured as a radio communication device.

Example 36 is a non-transitory computer readable medium storing instructions that when executed by a controller of a radio communication device direct the radio communication device to perform the method of any one of Examples 1 to 33.

Example 37 is a method of performing interference cancelation including obtaining one or more subsignals derived from an input signal for an amplifier, each of the one or more subsignals representing a non-linear component of an amplifier response and composed of a plurality of delay taps, separately applying a first filter and a second filter to the one or more subsignals to obtain an estimated interference signal, wherein the first filter approximates the amplifier response over the one or more subsignals and the second filter approximates the amplifier response over the plurality of delay taps, subtracting the estimated interference signal from a received signal to obtain a clean signal, and alternating between updating the first filter and updating the second filter using the clean signal.

In Example 38, the subject matter of Example 37 can optionally include wherein each of the one or more subsignals correspond to a kernel of the amplifier.

In Example 39, the subject matter of Example 37 or 38 can optionally include wherein the first filter and the second filter are vectors.

In Example 40, the subject matter of any one of Examples 37 to 39 can optionally include wherein each weight of the first filter corresponds to a respective one of the one or more subsignals and each weight of the second filter corresponds to a respective delay tap of the plurality of delay taps.

In Example 41, the subject matter of any one of Examples 37 to 40 can optionally include wherein the number of one or more subsignals is configurable the number of the plurality of delay taps is configurable.

In Example 42, the subject matter of any one of Examples 37 to 41 can optionally further include amplifying the input signal with the amplifier and transmitting the amplified input signal with a radio antenna.

In Example 43, the subject matter of Example 42 can optionally further include receiving the received signal with the radio antenna, wherein the estimated interference signal approximates leakage from the amplified input signal that is contains in the received signal.

In Example 44, the subject matter of any one of Examples 37 to 43 can optionally include wherein alternating between updating the first filter and updating the second filter using the clean signal includes updating the first filter and the second filter based on the one or more subsignals and the clean signal.

In Example 45, the subject matter of any one of Examples 37 to 43 can optionally include wherein alternating between updating the first filter and updating the second filter using the clean signal includes selecting between the first filter and the second filter to identify a current filter to update and a fixed filter to hold constant, applying the fixed filter to the one or more subsignals to obtain a decoupled input signal, and comparing the decoupled input signal to the clean signal to identify at least one weight of the current filter to update.

In Example 46, the subject matter of Example 45 can optionally include wherein comparing the decoupled input signal to the clean signal to identify the at least one weight of the current filter to update includes determining a cross-correlation vector between the decoupled input signal and the clean signal, identifying a first weight of the current filter to update based on the cross-correlation vector, and exclusively updating the first weight of the current filter.

In Example 47, the subject matter of Example 46 can optionally include wherein identifying the first weight of the current filter to update based on the cross-correlation vector includes identifying a maximum-valued element of the cross-correlation vector, and identifying the weight of the current filter with a corresponding element index to the maximum-valued element of the cross-correlation vector as the first weight.

In Example 48, the subject matter of Example 47 can optionally include wherein identifying the maximum-valued element of the cross-correlation vector includes identifying the element of the cross-correlation vector with the largest real component or the largest imaginary component as the maximum-valued element.

In Example 49, the subject matter of Example 45 can optionally include wherein comparing the decoupled input signal to the clean signal to identify the at least one weight of the current filter to update includes determining a cross-correlation vector between the decoupled input signal and the clean signal, and updating the at least one weight of the current filter to reduce a magnitude of the cross-correlation vector.

In Example 50, the subject matter of Example 49 can optionally include wherein updating the at least one weight of the current filter to reduce a magnitude of the cross-correlation vector includes updating the at least one weight of the current filter to reduce a magnitude of the cross-correlation vector according to a coordinate descent optimization scheme.

In Example 51, the subject matter of Example 49 can optionally include wherein updating the at least one weight of the current filter to reduce a magnitude of the cross-correlation vector includes updating the at least one weight of the current filter to reduce a magnitude of the cross-correlation vector according to a recursive least squares optimization scheme.

In Example 52, the subject matter of Example 49 can optionally include wherein updating the at least one weight of the current filter to reduce a magnitude of the cross-correlation vector includes updating the at least one weight of the current filter to reduce a magnitude of the cross-correlation vector according to a recursive least squares (RLS) dichotomous coordinate descent (DCD) optimization scheme.

In Example 53, the subject matter of Example 49 or 52 can optionally include wherein updating the at least one weight of the current filter to reduce a magnitude of the cross-correlation vector includes exclusively inverting a single bit of the first weight to reduce a magnitude of the cross-correlation vector.

In Example 54, the subject matter of Example 53 can optionally include wherein updating the at least one weight of the current filter to reduce a magnitude of the cross-correlation vector further includes evaluating one or more candidate bit inversions of the first weight to identify which of the one or more candidate bit inversions is closest to a predefined numerical difference, and identifying the single bit according to which of the one or more candidate bit inversions is closest to the predefined numerical difference.

In Example 55, the subject matter of Example 53 can optionally include wherein exclusively inverting the single bit of the first weight to reduce a magnitude of the cross-correlation vector includes inverting the single bit of the first weight according to a dichotomous coordinate descent optimization scheme.

In Example 56, the subject matter of Example 45 can optionally include wherein selecting between the first filter and the second filter to identify the current filter to update and the fixed filter to hold constant includes selecting the first filter as the current filter and the second filter as the fixed filter, and wherein applying the fixed filter to the one or more subsignals to obtain the decoupled input signal includes applying previous delay taps of the second filter to previous delay taps of the one or more subsignals during a preprocessing stage that occurs before receiving a most recent delay tap of the one or more subsignals, and after receiving the most recent delay tap of the one or more subsignals, applying a most recent delay tap of the second filter to the most recent delay tap of the one or more subsignals.

In Example 57, the subject matter of Example 56 can optionally further include performing the preprocessing stage during hidden clock cycles that occur before the most recent delay tap of the one or more subsignals is obtained.

In Example 58, the subject matter of Example 45 can optionally include wherein selecting between the first filter and the second filter to identify the current filter to update and the fixed filter to hold constant includes selecting the second filter as the current filter and the first filter as the fixed filter, and wherein applying the fixed filter to the one or more subsignals to obtain the decoupled input signal includes exclusively applying the first filter to samples of the one or more subsignals corresponding to a single delay tap of the one or more subsignals to obtain a first element of the decoupled input signal.

In Example 59, the subject matter of Example 58 can optionally include wherein the remaining elements of the decoupled input signal are time-delayed weighted versions of the first element of the decoupled input signal.

In Example 60, the subject matter of any one of Examples 37 to 55 can optionally include wherein alternating between updating the first filter and updating the second filter using the clean signal includes selecting between the first filter and the second filter to identify a current filter to update and a fixed filter to hold constant, applying the fixed filter to the one or more subsignals to obtain a decoupled input signal, determining a cross-correlation vector between the decoupled input signal and the clean signal and determining a correlation matrix of the decoupled input signal, and updating at least one weight of the current filter based on the cross-correlation vector and the correlation matrix.

In Example 61, the subject matter of Example 60 can optionally include wherein determining the cross-correlation vector between the decoupled input signal and the clean signal includes determining some elements of the cross-correlation vector during a first clock cycle with first calculation circuitry and determining other elements of the cross-correlation vector during a second clock cycle with the same first calculation circuitry, or determining some elements of the correlation matrix during a third clock cycle with second calculation circuitry and determining other elements of the correlation matrix during a second clock cycle with the same second calculation circuitry.

In Example 62, the subject matter of Example 60 can optionally include wherein selecting between the first filter and the second filter to identify a current filter to update and a fixed filter to hold constant includes selecting the first filter as the current filter and the second filter as the fixed filter, and wherein determining the cross-correlation vector between the decoupled input signal and the clean signal and determining the correlation matrix of the decoupled input signal includes exclusively determining the upper-triangle elements of the correlation matrix.

In Example 63, the subject matter of Example 62 can optionally include wherein the correlation matrix is Hermitian matrix.

In Example 64, the subject matter of Example 60 can optionally include wherein selecting between the first filter and the second filter to identify the current filter to update and the fixed filter to hold constant includes selecting the second filter as the current filter and the first filter as the fixed filter, and wherein determining the cross-correlation vector between the decoupled input signal and the clean signal and determining the correlation matrix of the decoupled input signal includes exclusively determining the a single row of the correlation matrix.

In Example 65, the subject matter of Example 64 can optionally include wherein a plurality of rows including the single row of the correlation matrix are statistically similar.

In Example 66, the subject matter of any one of Examples 37 to 65 can optionally include wherein alternating between updating the first filter and updating the second filter using the clean signal includes using shared circuitry to update the first filter and re-using the same shared circuitry to update the second filter.

In Example 67, the subject matter of any one of Examples 37 to 65 can optionally include wherein alternating between updating the first filter and updating the second filter using the clean signal includes using shared circuitry to update the first filter and re-using the same shared circuitry to update the second filter according to a pipeline clock schedule.

In Example 68, the subject matter of any one of Examples 37 to 65 can optionally include wherein alternating between updating the first filter and updating the second filter using the clean signl includes updating the first filter at one or more first times and updating the delay tap dimension filter at one or more different second times.

Example 69 is a communication circuitry arrangement configured to perform the method of any one of Examples 37 to 68.

In Example 70, the subject matter of Example 69 can optionally be configured as a radio communication device.

Example 71 is a non-transitory computer readable medium storing instructions that when executed by a controller of a radio communication device direct the radio communication device to perform the method of any one of Examples 37 to 68.

Example 72 is a communication circuit arrangement including a signal path circuit configured to separately apply a kernel dimension filter and a delay tap dimension filter to an input signal for an amplifier to obtain an estimated interference signal, a cancelation circuit configured to subtract the estimated interference signal from a received signal to obtain a clean signal, and a filter update circuit configured to alternate between updating the kernel dimension filter and the delay tap dimension filter using the clean signal.

In Example 73, the subject matter of Example 72 can optionally be configured as a radio communication device and further including a receive chain, a radio antenna, and a transmit chain including the amplifier.

In Example 74, the subject matter of Example 73 can optionally include wherein the amplifier is configured to amplify the input signal and the radio antenna is configured to transmit the amplified input signal.

In Example 75, the subject matter of Example 73 or 74 can optionally include wherein the receive chain is configured to receive the received signal via the radio antenna, wherein the estimated interference signal approximates leakage from the transmit chain to the receive chain.

In Example 76, the subject matter of any one of Examples 72 to 75 can optionally further include a kernel generation circuit configured to process the input signal to derive a plurality of kernel signals from the input signal, each of the plurality of kernel signals approximating a non-linear component of a response of the amplifier wherein the signal path circuit is configured to separately apply the kernel dimension filter and the delay dimension filter to the input signal by separately applying the kernel dimension filter and the delay tap dimension filter to the plurality of kernel signals to obtain the estimated interference signal.

In Example 77, the subject matter of Example 76 can optionally include wherein each of the plurality of kernel signals is composed of a plurality of delay taps, wherein each weight of the kernel dimension filter corresponds to a respective one of the plurality of kernel signals and each weight of the delay tap dimension filter corresponds to a respective one of the plurality of delay taps.

In Example 78, the subject matter of Example 77 can optionally include wherein the signal path circuit and the filter update circuit are configured to support an adjustable number of kernel signals or a adjustable number of delay taps.

In Example 79, the subject matter of Example 77 can optionally include wherein the kernel dimension filter approximates the response of the amplifier over the plurality of kernel signals and the delay tap dimension filter approximates the response of the amplifier over the plurality of delay taps.

In Example 80, the subject matter of any one of Examples 72 to 79 can optionally include wherein the kernel dimension filter and the delay tap dimension filter are vectors.

In Example 81, the subject matter of any one of Examples 72 to 80 can optionally include wherein the filter update circuit is configured to alternate between updating the kernel dimension filter and updating the delay tap dimension filter using the clean signal by updating the kernel dimension filter and the delay tap dimension filter based on the input signal and the clean signal.

In Example 82, the subject matter of any one of Examples 76 to 81 can optionally include wherein the filter update circuit is configured to alternate between updating the kernel dimension filter and the delay tap dimension filter using the clean signal by selecting between the kernel dimension filter and the delay tap dimension filter to identify a current filter to update and a fixed filter to hold constant, applying the fixed filter to the plurality of kernel signals to obtain a decoupled input signal, and comparing the decoupled input signal to the clean signal to identify at least one weight of the current filter to update.

In Example 83, the subject matter of Example 82 can optionally include wherein the filter update circuit is configured to compare the decoupled input signal to identify the at least one weight of the current filter to update by determining a cross-correlation vector between the decoupled input signal and the clean signal, identifying a first weight of the current filter to update based on the cross-correlation vector, and exclusively updating the first weight of the current filter.

In Example 84, the subject matter of Example 83 can optionally include wherein the filter update circuit is configured to identify the first weight of the current filter to update based on the cross-correlation vector by identifying a maximum-valued element of the cross-correlation vector, and identifying the weight of the current filter with a corresponding element index to the maximum-valued element of the cross-correlation vector as the first weight.

In Example 85, the subject matter of Example 84 can optionally include wherein the filter update circuit is configured to identify the maximum-valued element of the cross-correlation vector by identifying the element of the cross-correlation vector with the largest real component or the largest imaginary component as the maximum-valued element.

In Example 86, the subject matter of Example 82 can optionally include wherein the filter update circuit is configured to compare the decoupled input signal to the clean signal to identify the at least one weight of the current filter to update by determining a cross-correlation vector between the decoupled input signal and the clean signal, and updating the at least one weight of the current filter to reduce a magnitude of the cross-correlation vector.

In Example 87, the subject matter of Example 86 can optionally include wherein the filter update circuit is configured to update the at least one weight of the current filter to reduce a magnitude of the cross-correlation vector by updating the at least one weight of the current filter to reduce a magnitude of the cross-correlation vector according to a recursive least squares optimization scheme.

In Example 88, the subject matter of Example 86 can optionally include wherein the filter update circuit is configured to update the at least one weight of the current filter to reduce a magnitude of the cross-correlation vector by updating the at least one weight of the current filter to reduce a magnitude of the cross-correlation vector according to a recursive least squares (RLS) dichotomous coordinate descent (DCD) optimization scheme.

In Example 89, the subject matter of Example 86 can optionally include wherein the filter update circuit is configured to update the at least one weight of the current filter to reduce a magnitude of the cross-correlation vector by updating the at least one weight of the current filter to reduce a magnitude of the cross-correlation vector according to a coordinate descent optimization scheme.

In Example 90, the subject matter of Example 86 can optionally include wherein the filter update circuit is configured to update the at least one weight of the current filter to reduce a magnitude of the cross-correlation vector by exclusively inverting a single bit of the first weight to reduce a magnitude of the cross-correlation vector.

In Example 91, the subject matter of Example 90 can optionally include wherein the filter update circuit is further configured to update the at least one weight of the current filter to reduce the cross-correlation by evaluating one or more candidate bit inversions of the first weight to identify which of the one or more candidate bit inversions is closest to a predefined numerical difference, and identifying the single bit according to which of the one or more candidate bit inversions is closest to the predefined numerical difference.

In Example 92, the subject matter of Example 90 can optionally include wherein the filter update circuit is configured to exclusively invert the single bit of the first weight to reduce a magnitude of the cross-correlation vector by inverting the single bit of the first weight according to a dichotomous coordinate descent optimization scheme.

In Example 93, the subject matter of Example 82 can optionally include wherein the filter update circuit is configured to select between the kernel dimension filter and the delay tap dimension filter to identify the current filter to update and the fixed filter to hold constant by selecting the kernel dimension filter as the current filter and the delay tap dimension filter as the fixed filter, and wherein the filter update circuit is configured to apply the fixed filter to the plurality of kernel signals to obtain the decoupled input signal by applying previous delay taps of the delay tap dimension filter to previous delay taps of the plurality of kernel signals during a preprocessing stage that occurs before receiving a most recent delay tap of the plurality of kernel signals, and after receiving the most recent delay tap of the plurality of kernel signals, applying a most recent delay tap of the delay tap dimension filter to the most recent delay tap of the plurality of kernel signals.

In Example 94, the subject matter of Example 93 can optionally include wherein the filter update circuit is configured to perform the preprocessing stage during hidden clock cycles that occur before the most recent delay tap of the plurality of kernel signals is obtained.

In Example 95, the subject matter of Example 82 can optionally include wherein the filter update circuit is configured to select between the kernel dimension filter and the delay tap dimension filter to identify the current filter to update and the fixed filter to hold constant by selecting the delay tap dimension filter as the current filter and the kernel dimension filter as the fixed filter, and wherein the filter update circuit is configured to apply the fixed filter to the plurality of kernel signals to obtain the decoupled input signal by exclusively applying the kernel dimension filter to samples of the plurality of kernel signals corresponding to a single delay tap to obtain a first element of the decoupled input signal.

In Example 96, the subject matter of Example 95 can optionally include wherein the remaining elements of the decoupled input signal are time-delayed weighted versions of the first element of the decoupled input signal.

In Example 97, the subject matter of any one of Examples 75 to 96 can optionally include wherein the filter update circuit is configured to alternate between updating the kernel dimension filter and updating the delay tap dimension filter using the clean signal by selecting between the kernel dimension filter and the delay tap dimension filter to identify a current filter to update and a fixed filter to hold constant, applying the fixed filter to the plurality of kernel signals to obtain a decoupled input signal, determining a cross-correlation vector between the decoupled input signal and the clean signal and determining a correlation matrix of the decoupled input signal, and updating at least one weight of the current filter based on the cross-correlation vector and the correlation matrix.

In Example 98, the subject matter of Example 97 can optionally include wherein the filter update circuit is configured to determine the cross-correlation vector between the decoupled input signal and the clean signal by determining some elements of the cross-correlation vector during a first clock cycle with first calculation circuitry and determining other elements of the cross-correlation vector during a second clock cycle with the same first calculation circuitry, or determining some elements of the correlation matrix during a third clock cycle with second calculation circuitry and determining other elements of the correlation matrix during a second clock cycle with the same second calculation circuitry.

In Example 99, the subject matter of Example 97 can optionally include wherein the filter update circuit is configured to select between the kernel dimension filter and the delay tap dimension filter to identify the current filter to update and the fixed filter to hold constant by selecting the kernel dimension filter as the current filter and the delay tap dimension filter as the fixed filter, and wherein the filter update circuit is configured to determine the cross-correlation vector between the decoupled input signal and the clean signal and determining the correlation matrix of the decoupled input signal by exclusively determining the upper-triangle elements of the correlation matrix.

In Example 100, the subject matter of Example 99 can optionally include wherein the correlation matrix is a Hermitian matrix.

In Example 101, the subject matter of Example 97 can optionally include wherein the filter update circuit is configured to select between the kernel dimension filter and the delay tap dimension filter to identify the current filter to update and the fixed filter to hold constant by selecting the delay tap dimension filter as the current filter and the kernel dimension filter as the fixed filter, and wherein the filter update circuit is configured to determine the cross-correlation vector between the decoupled input signal and the clean signal and determining the correlation matrix of the decoupled input signal by exclusively determining a single row of the correlation matrix.

In Example 102, the subject matter of Example 101 can optionally include wherein a plurality of rows including the single row of the correlation matrix are statistically similar.

In Example 103, the subject matter of any one of Examples 72 to 102 can optionally include wherein the filter update circuit is configured to alternate between updating the kernel dimension filter and updating the delay tap dimension filter using the clean signal by using shared circuitry to update the kernel dimension filter and re-using the same shared circuitry to update the delay tap dimension filter.

In Example 104, the subject matter of any one of Examples 72 to 102 can optionally include wherein the filter update circuit is configured to alternate between updating the kernel dimension filter and updating the delay tap dimension filter using the clean signal by using shared circuitry to update the kernel dimension filter and re-using the same shared circuitry to update the delay tap dimension filter according to a pipeline clock schedule.

In Example 105, the subject matter of Example 104 can optionally include wherein the filter update circuit is configured to alternate between updating the kernel dimension filter and updating the delay tap dimension filter using the clean signal by updating the kernel dimension filter at one or more first times and updating the delay tap dimension at one or more different second times.

Example 106 is a communication circuit arrangement including a subsignal generation circuit configured to obtain one or more subsignals from an input signal for an amplifier, each of the one or more subsignals representing a non-linear component of an amplifier response and composed of a plurality of delay taps, a signal path circuit configured to separately apply a first filter and a second filter to the one or more subsignals to obtain an estimated interference signal, wherein the first filter approximates the amplifier response over the one or more subsignals and the second filter approximates the amplifier response over the plurality of delay taps, a cancelation circuit configured to subtract the estimated interference signal from the received signal to obtain a clean signal, and a filter update circuit configured to alternate between updating the first filter and updating the second filter using the clean signal.

In Example 107, the subject matter of Example 106 can optionally be configured as a radio communication device and further including a receive chain, a radio antenna, and a transmit chain including the amplifier.

In Example 108, the subject matter of Example 107 can optionally include wherein the amplifier is configured to amplify the input signal and the radio antenna is configured to transmit the amplified input signal.

In Example 109, the subject matter of Example 107 or 108 can optionally include wherein the receive chain is configured to receive the received signal via the radio antenna, wherein the estimated interference signal approximates leakage from the transmit chain to the receive chain.

In Example 110, the subject matter of any one of Examples 106 to 109 can optionally include wherein each of the one or more subsignals correspond to a kernel of the amplifier.

In Example 111, the subject matter of any one of Examples 106 to 110 can optionally include wherein the first filter and the second filter are vectors.

In Example 112, the subject matter of any one of Examples 106 to 111 can optionally include wherein each of weight of the first filter corresponds to a respective one of the one or more subsignals and each weight of the second filter corresponds to a respective delay tap of the plurality of delay taps.

In Example 113, the subject matter of any one of Examples 106 to 112 can optionally include wherein the signal path circuit and the filter update circuit are configured to support an adjustable number of subsignals or an adjustable number of delay taps.

In Example 114, the subject matter of any one of Examples 106 to 113 can optionally include wherein the filter update circuit is configured to alternate between updating the first filter and updating the second filter using the clean signal by updating the first filter and the second filter based on the one or more subsignals and the clean signal.

In Example 115, the subject matter of any one of Examples 106 to 113 can optionally include wherein the filter update circuit is configured to alternate between updating the first filter and updating the second filter using the clean signal by selecting between the first filter and the second filter to identify a current filter to update and a fixed filter to hold constant, applying the fixed filter to the one or more subsignals to obtain a decoupled input signal, and comparing the decoupled input signal to the clean signal to identify at least one weight of the current filter to update.

In Example 116, the subject matter of Example 115 can optionally include wherein the filter update circuit is configured to compare the decoupled input signal to the clean signal to identify the at least one weight of the current filter to update by determining a cross-correlation vector between the decoupled input signal and the clean signal, identifying a first weight of the current filter to update based on the cross-correlation vector, and exclusively updating the first weight of the current filter.

In Example 117, the subject matter of Example 116 can optionally include wherein the filter update circuit is configured to identify the first weight of the current filter to update based on the cross-correlation vector by identifying a maximum-valued element of the cross-correlation vector, and identifying the weight of the current filter with a corresponding element index to the maximum-valued element of the cross-correlation vector as the first weight.

In Example 118, the subject matter of Example 117 can optionally include wherein the filter update circuit is configured to identify the maximum-valued element of the cross-correlation vector by identifying the element of the cross-correlation vector with the largest real component or the largest imaginary component as the maximum-valued element.

In Example 119, the subject matter of Example 115 can optionally include wherein the filter update circuit is configured to compare the decoupled input signal to the clean signal to identify the at least one weight of the current filter to update by determining a cross-correlation vector between the decoupled input signal and the clean signal, and updating the at least one weight of the current filter to reduce a magnitude of the cross-correlation vector.

In Example 120, the subject matter of Example 119 can optionally include wherein the filter update circuit is configured to update the at least one weight of the current filter to reduce a magnitude of the cross-correlation vector by updating the at least one weight of the current filter to reduce a magnitude of the cross-correlation vector according to a coordinate descent optimization scheme.

In Example 121, the subject matter of Example 119 can optionally include wherein the filter update circuit is configured to update the at least one weight of the current filter to reduce a magnitude of the cross-correlation vector by updating the at least one weight of the current filter to reduce a magnitude of the cross-correlation vector according to a recursive least squares optimization scheme.

In Example 122, the subject matter of Example 119 can optionally include wherein the filter update circuit is configured to update the at least one weight of the current filter to reduce a magnitude of the cross-correlation vector by updating the at least one weight of the current filter to reduce a magnitude of the cross-correlation vector according to a recursive least squares (RLS) dichotomous coordinate descent (DCD) optimization scheme.

In Example 123, the subject matter of Example 119 can optionally include wherein the filter update circuit is configured to update the at least one weight of the current filter to reduce a magnitude of the cross-correlation vector by exclusively inverting a single bit of the first weight to reduce a magnitude of the cross-correlation vector.

In Example 124, the subject matter of Example 123 can optionally include wherein the filter update circuit is configured to update the at least one weight of the current filter to reduce a magnitude of the cross-correlation vector further by evaluating one or more candidate bit inversions of the first weight to identify which of the one or more candidate bit inversions is closest to a predefined numerical difference, and identifying the single bit according to which of the one or more candidate bit inversions is closest to the predefined numerical difference.

In Example 125, the subject matter of Example 123 can optionally include wherein the filter update circuit is configured to exclusively invert the single bit of the first weight to reduce a magnitude of the cross-correlation vector by inverting the single bit of the first weight according to a dichotomous coordinate descent optimization scheme.

In Example 126, the subject matter of Example 115 can optionally include wherein the filter update circuit is configured to select between the first filter and the second filter to identify the current filter to update and the fixed filter to hold constant by selecting the first filter as the current filter and the second filter as the fixed filter, and wherein the filter update circuit is configured to apply the fixed filter to the one or more subsignals to obtain the decoupled input signal by applying previous delay taps of the second filter to previous delay taps of the one or more subsignals during a preprocessing stage that occurs before receiving a most recent delay tap of the one or more subsignals, and after receiving the most recent delay tap of the one or more subsignals, applying a most recent delay tap of the second filter to the most recent delay tap of the one or more subsignals.

In Example 127, the subject matter of Example 126 can optionally include wherein the filter update circuit is configured to perform the preprocessing stage during hidden clock cycles that occur before the most recent delay tap of the one or more subsignals is obtained.

In Example 128, the subject matter of Example 115 can optionally include wherein the filter update circuit is configured to select between the first filter and the second filter to identify the current filter to update and the fixed filter to hold constant by selecting the second filter as the current filter and the first filter as the fixed filter, and wherein applying the fixed filter to the one or more subsignals to obtain the decoupled input signal by exclusively applying the first filter to samples of the one or more subsignals corresponding to a single delay tap of the one or more subsignals to obtain a first element of the decoupled input signal.

In Example 129, the subject matter of Example 128 can optionally include wherein the remaining elements of the decoupled input signal are time-delayed weighted versions of the first element of the decoupled input signal.

In Example 130, the subject matter of any one of Examples 106 to 125 can optionally include wherein the filter update circuit is configured to alternate between updating the first filter and updating the second filter using the clean signal by selecting between the first filter and the second filter to identify a current filter to update and a fixed filter to hold constant, applying the fixed filter to the one or more subsignals to obtain a decoupled input signal, determining a cross-correlation vector between the decoupled input signal and the clean signal and determining a correlation matrix of the decoupled input signal, and updating at least one weight of the current filter based on the cross-correlation vector and the correlation matrix.

In Example 131, the subject matter of Example 130 can optionally include wherein the filter update circuit is configured to determine the cross-correlation vector between the decoupled input signal and the clean signal by determining some elements of the cross-correlation vector during a first clock cycle with first calculation circuitry and determining other elements of the cross-correlation vector during a second clock cycle with the same first calculation circuitry, or determining some elements of the correlation matrix during a third clock cycle with second calculation circuitry and determining other elements of the correlation matrix during a second clock cycle with the same second calculation circuitry.

In Example 132, the subject matter of Example 130 can optionally include wherein the filter update circuit is configured to select between the first filter and the second filter to identify a current filter to update and a fixed filter to hold constant by selecting the first filter as the current filter and the second filter as the fixed filter, and wherein the filter update circuit is configured to determine the cross-correlation vector between the decoupled input signal and the clean signal and determining the correlation matrix of the decoupled input signal by exclusively determining the upper-triangle elements of the correlation matrix.

In Example 133, the subject matter of Example 132 can optionally include wherein the correlation matrix is Hermitian matrix.

In Example 134, the subject matter of Example 130 can optionally include wherein the filter update circuit is configured to select between the first filter and the second filter to identify the current filter to update and the fixed filter to hold constant by selecting the second filter as the current filter and the first filter as the fixed filter, and wherein the filter update circuit is configured to determine the cross-correlation vector between the decoupled input signal and the clean signal and determining the correlation matrix of the decoupled input signal by exclusively determining the a single row of the correlation matrix.

In Example 135, the subject matter of Example 134 can optionally include wherein a plurality of rows including the single row of the correlation matrix are statistically similar.

In Example 136, the subject matter of any one of Examples 106 to 135 can optionally include wherein the filter update circuit is configured to alternate between updating the first filter and updating the second filter using the clean signal by using shared circuitry to update the first filter and re-using the same shared circuitry to update the second filter.

In Example 137, the subject matter of any one of Examples 106 to 135 can optionally include wherein the filter update circuit is configured to alternate between updating the first filter and updating the second filter using the clean signal by using shared circuitry to update the first filter and re-using the same shared circuitry to update the second filter according to a pipeline clock schedule.

In Example 138, the subject matter of any one of Examples 106 to 135 can optionally include wherein the filter update circuit is configured to alternate between updating the first filter and updating the second filter using the clean signal by updating the first filter at one or more first times and updating the delay tap dimension filter at one or more different second times.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of performing interference cancelation comprising:
   processing an input signal for an amplifier to obtain a plurality of kernel signals that approximate non-linear components of a response of the amplifier;
   separately applying a kernel dimension filter and a delay tap dimension filter to the plurality of kernel signals to obtain an estimated interference signal, where the kernel dimension filter approximates the response of the amplifier over the plurality of kernel signals;
   subtracting the estimated interference signal from a received signal to obtain a clean signal; and
   alternating between updating the kernel dimension filter and updating the delay tap dimension filter using the clean signal by:
   selecting between the kernel dimension filter and the delay tap dimension filter to identify a current filter to update and a fixed filter to hold constant, and updating the current filter based on the input signal and the clean signal.

2. The method of claim 1, wherein each of the plurality of kernel signals is composed of a plurality of delay taps, wherein each weight of the kernel dimension filter corresponds to a respective one of the plurality of kernel signals and each weight of the delay tap dimension filter corresponds to a respective one of the plurality of delay taps.

3. A communication circuit arrangement comprising:
   a kernel generation circuit configured to process an input signal for an amplifier to obtain a plurality of kernel signals that approximate non-linear components of a response of the amplifier;
   a signal path circuit configured to separately apply a kernel dimension filter and a delay tap dimension filter to the plurality of kernel signals to obtain an estimated interference signal, where the kernel dimension filter approximates the response of the amplifier over the plurality of kernel signals;
   a cancelation circuit configured to subtract the estimated interference signal from a received signal to obtain a clean signal; and
   a filter update circuit configured to alternate between updating the kernel dimension filter and the delay tap dimension filter using the clean signal by:
   selecting between the kernel dimension filter and the delay tap dimension filter to identify a current filter to update and a fixed filter to hold constant, and
   updating the current filter based on the input signal and the clean signal.

4. The communication circuit arrangement of claim 3, configured as a radio communication device and further comprising a receive chain, a radio antenna, and a transmit chain comprising the amplifier.

5. The communication circuit arrangement of claim 4, wherein the amplifier is configured to amplify the input signal and the radio antenna is configured to transmit the amplified input signal.

6. The communication circuit arrangement of claim 4, wherein the receive chain is configured to receive the received signal via the radio antenna, wherein the estimated interference signal approximates leakage from the transmit chain to the receive chain.

7. The communication circuit arrangement of claim 3, wherein each of the plurality of kernel signals is composed of a plurality of delay taps, wherein each weight of the kernel dimension filter corresponds to a respective one of the plurality of kernel signals and each weight of the delay tap dimension filter corresponds to a respective one of the plurality of delay taps.

8. The communication circuit arrangement of claim 3, wherein the filter update circuit is configured to alternate between updating the kernel dimension filter and the delay tap dimension filter using the clean signal by:
   applying the fixed filter to the plurality of kernel signals to obtain a decoupled input signal; and
   comparing the decoupled input signal to the clean signal to identify at least one weight of the current filter to update.

9. The communication circuit arrangement of claim 8, wherein the filter update circuit is configured to compare the decoupled input signal to identify the at least one weight of the current filter to update by:
   determining a cross-correlation vector between the decoupled input signal and the clean signal;
   identifying a first weight of the current filter to update based on the cross-correlation vector; and
   exclusively updating the first weight of the current filter.

10. The communication circuit arrangement of claim 9, wherein the filter update circuit is configured to identify the first weight of the current filter to update based on the cross-correlation vector by:
    identifying a maximum-valued element of the cross-correlation vector; and
    identifying the weight of the current filter with a corresponding element index to the maximum-valued element of the cross-correlation vector as the first weight.

11. The communication circuit arrangement of claim 8, wherein the filter update circuit is configured to compare the decoupled input signal to the clean signal to identify the at least one weight of the current filter to update by:
    determining a cross-correlation vector between the decoupled input signal and the clean signal; and
    updating the at least one weight of the current filter to reduce a magnitude of the cross-correlation vector.

12. The communication circuit arrangement of claim 11, wherein the filter update circuit is configured to update the at least one weight of the current filter to reduce a magnitude of the cross-correlation vector by:
    exclusively inverting a single bit of the first weight to reduce a magnitude of the cross-correlation vector.

13. The communication circuit arrangement of claim 6, wherein the filter update circuit is configured to alternate between updating the kernel dimension filter and updating the delay tap dimension filter using the clean signal by:
    selecting between the kernel dimension filter and the delay tap dimension filter to identify a current filter to update and a fixed filter to hold constant;
    applying the fixed filter to the plurality of kernel signals to obtain a decoupled input signal;
    determining a cross-correlation vector between the decoupled input signal and the clean signal and determining a correlation matrix of the decoupled input signal; and
    updating at least one weight of the current filter based on the cross-correlation vector and the correlation matrix.

14. The communication circuit arrangement of claim 3, wherein the filter update circuit is configured to alternate between updating the kernel dimension filter and updating the delay tap dimension filter using the clean signal by:
    using shared circuitry to update the kernel dimension filter and re-using the same shared circuitry to update the delay tap dimension filter according to a pipeline clock schedule.

15. The communication circuit arrangement of claim 3, wherein the kernel dimension filter comprises a plurality of weights that approximate a response of the amplifier over a plurality of non-linear components of the amplifier and the delay tap dimension filter comprises a plurality of weights that approximate the response of the amplifier over a plurality of delay taps of the input signal.

* * * * *